(12) United States Patent  
Schieffelin

(10) Patent No.: US 8,983,704 B2  
(45) Date of Patent: Mar. 17, 2015

(54) VERSATILE ELECTRIC BICYCLE SYSTEMS

(71) Applicant: Civilized Cycles Incorporated, Brooklyn, NY (US)

(72) Inventor: Zachary Schieffelin, Brooklyn, NY (US)

(73) Assignee: Civilized Cycles Incorporated, Brooklyn, NY (US)

( * ) Notice: Subject to any disclaimer, the term of this patent is extended or adjusted under 35 U.S.C. 154(b) by 0 days.

(21) Appl. No.: 14/255,500

(22) Filed: Apr. 17, 2014

(65) Prior Publication Data

US 2014/0343773 A1    Nov. 20, 2014

Related U.S. Application Data

(63) Continuation of application No. 14/178,205, filed on Feb. 11, 2014, now Pat. No. 8,738,212, which is a continuation of application No. PCT/US2013/060706, filed on Sep. 19, 2013.

(60) Provisional application No. 61/704,375, filed on Sep. 21, 2012.

(51) Int. Cl.
| | |
|---|---|
| *B60W 10/08* | (2006.01) |
| *B62M 6/45* | (2010.01) |
| *B60W 40/12* | (2012.01) |
| *G06F 9/00* | (2006.01) |
| *B60L 15/20* | (2006.01) |

(52) U.S. Cl.
CPC .............. *B62M 6/45* (2013.01); *B60W 40/12* (2013.01); *G06F 9/00* (2013.01); *B60L 15/20* (2013.01); *B60L 2200/12* (2013.01)

USPC ............ 701/22; 701/99; 180/220; 180/205.1; 180/206.1; 180/65.1

(58) Field of Classification Search
USPC ............... 701/22, 99; 475/149, 155; 318/1, 2, 318/139; 180/218, 220, 205.1, 180/206.1–206.8, 65.1, 65.51; 211/4, 5, 26
See application file for complete search history.

(56) References Cited

U.S. PATENT DOCUMENTS

| | | | |
|---|---|---|---|
| 5,007,675 A | | 4/1991 | Musto et al. |
| 5,480,356 A | * | 1/1996 | Campagnolo ................... 474/70 |
| 5,789,898 A | | 8/1998 | Suzuki et al. |
| 5,917,407 A | * | 6/1999 | Squire et al. .................. 340/432 |
| 5,924,511 A | * | 7/1999 | Takata ....................... 180/206.2 |
| 6,006,850 A | * | 12/1999 | Yu ................................. 180/220 |
| 6,155,369 A | | 12/2000 | Whittaker |
| 6,827,397 B1 | | 12/2004 | Driver |

(Continued)

OTHER PUBLICATIONS

XMK e-Bike System, Jul. 2012, SuZhou Minshine Electronic Co.*

(Continued)

*Primary Examiner* — Thomas G Black  
*Assistant Examiner* — Sara Nelson  
(74) *Attorney, Agent, or Firm* — Knobbe Martens Olson & Bear LLP

(57) ABSTRACT

The disclosure herein provides systems for a versatile electric bicycle that is configured to be easily adapted to accommodate various needs and requirements. In certain embodiments, the foregoing may provide features and/or models that are configured to be easily adapted to accommodate parts of varying dimensions, different seating configurations, and/or particular laws and regulations of different jurisdictions.

17 Claims, 32 Drawing Sheets

(56) References Cited

U.S. PATENT DOCUMENTS

| | | |
|---|---|---|
| 7,261,175 B1 | 8/2007 | Fahrner |
| 7,273,123 B2 | 9/2007 | Perng |
| 7,461,714 B2 | 12/2008 | Holland |
| 7,660,658 B2 * | 2/2010 | Sheynblat ............. 701/93 |
| 7,753,157 B1 | 7/2010 | Woods |
| 7,833,129 B2 | 11/2010 | Badarneh et al. |
| 7,886,947 B2 | 2/2011 | Campagnolo |
| 8,035,046 B2 | 10/2011 | Perini |
| 8,205,705 B2 | 6/2012 | Li et al. |
| 8,738,212 B1 | 5/2014 | Schieffelin |
| 2007/0198160 A1 | 8/2007 | Sheynblat |
| 2010/0089846 A1 * | 4/2010 | Navarro Ruiz et al. ........ 211/4 |
| 2010/0133778 A1 | 6/2010 | Munksoe |
| 2010/0206652 A1 * | 8/2010 | Kielland ............... 180/220 |
| 2011/0071701 A1 * | 3/2011 | Holub et al. ............ 701/2 |
| 2011/0309660 A1 | 12/2011 | Hukey et al. |
| 2012/0061435 A1 | 3/2012 | Lavery |
| 2014/0074391 A1 * | 3/2014 | Tate, Jr. ............... 701/400 |

OTHER PUBLICATIONS

XMK e-Bike System, XMK e-Bike System, Jul. 2012, SuZhou Minshine Electronic Co.*

PCT International Search Report and Written Opinion for PCT/US 2013/060706, Mailed Sep. 19, 2013.

Speedict Technology, Speedict eBike Android Client, Mar. 2012.

iGO electric, iGO Owners Manual, Mar. 2011.

Cycle Analyst, The Cycle Analyst Large Screen Edition User Manual, May 2011.

SuZhou Minshine electronic Co., XMK e-Bike System, Jul. 2012.

* cited by examiner

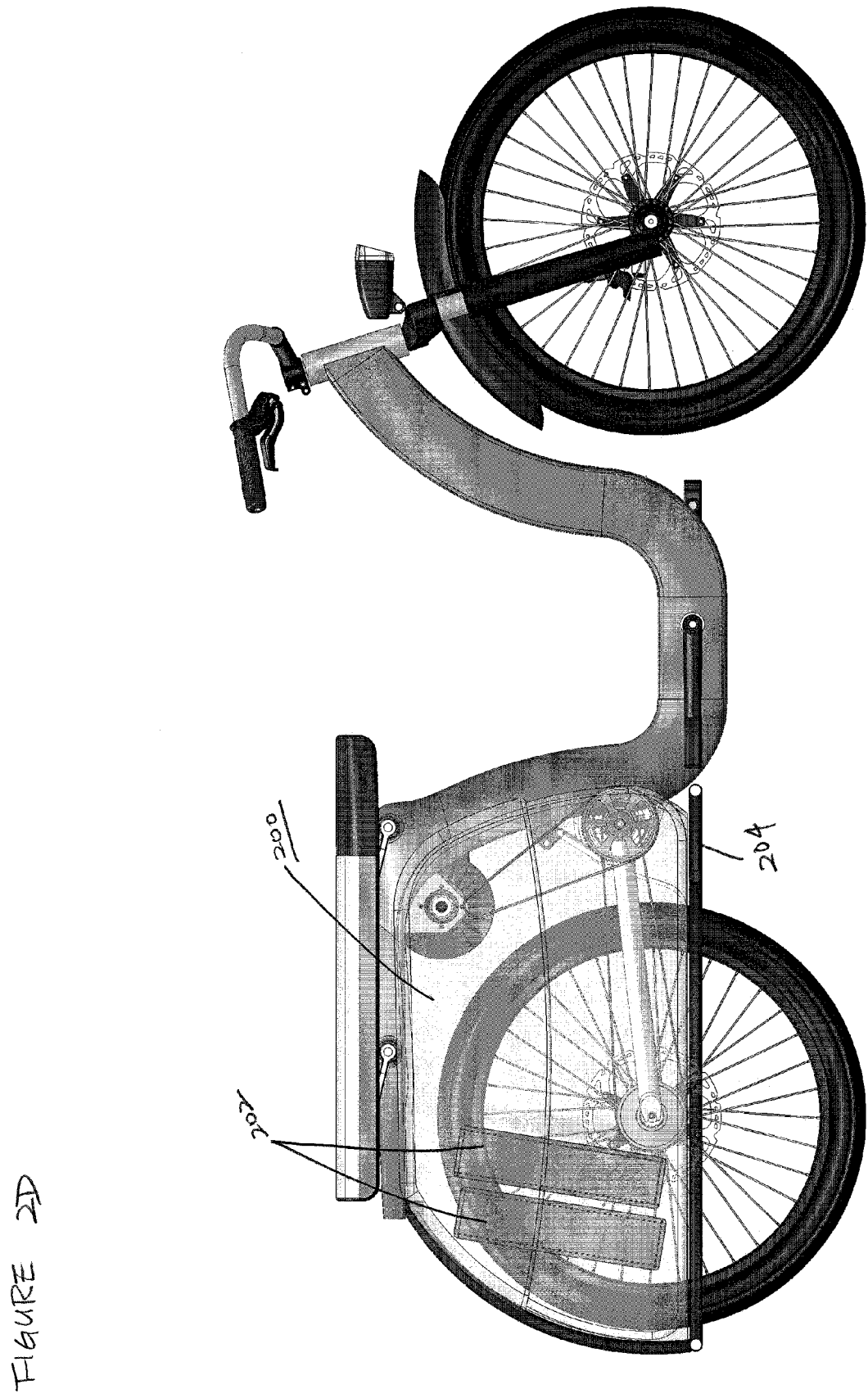

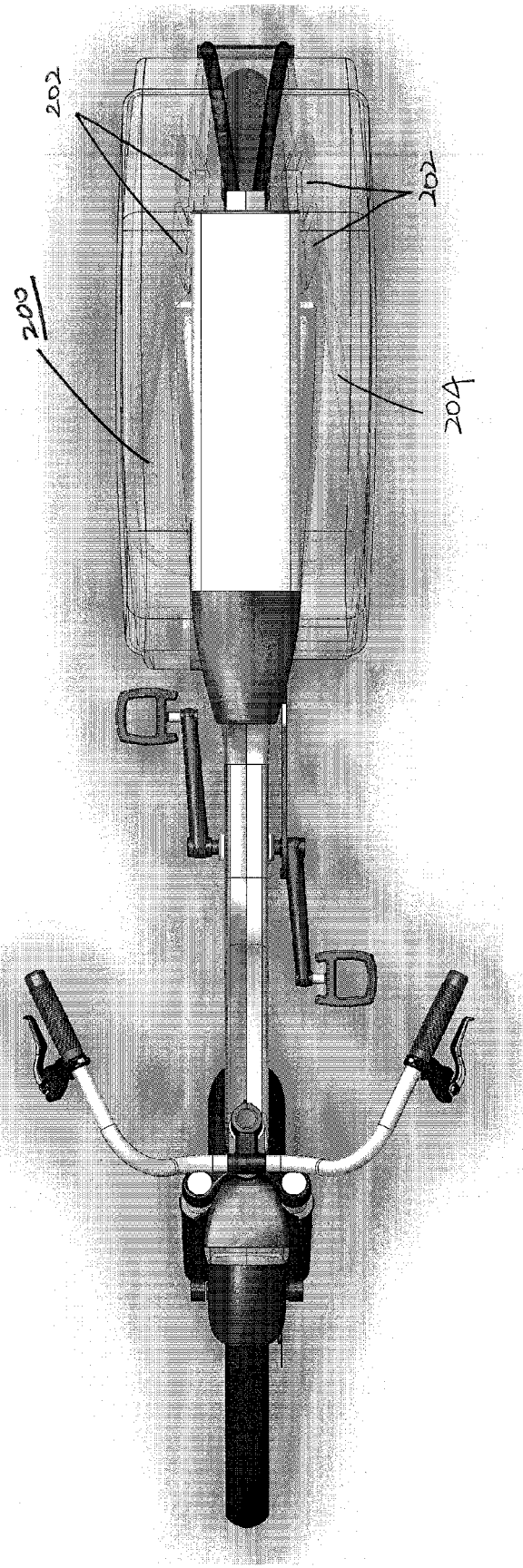

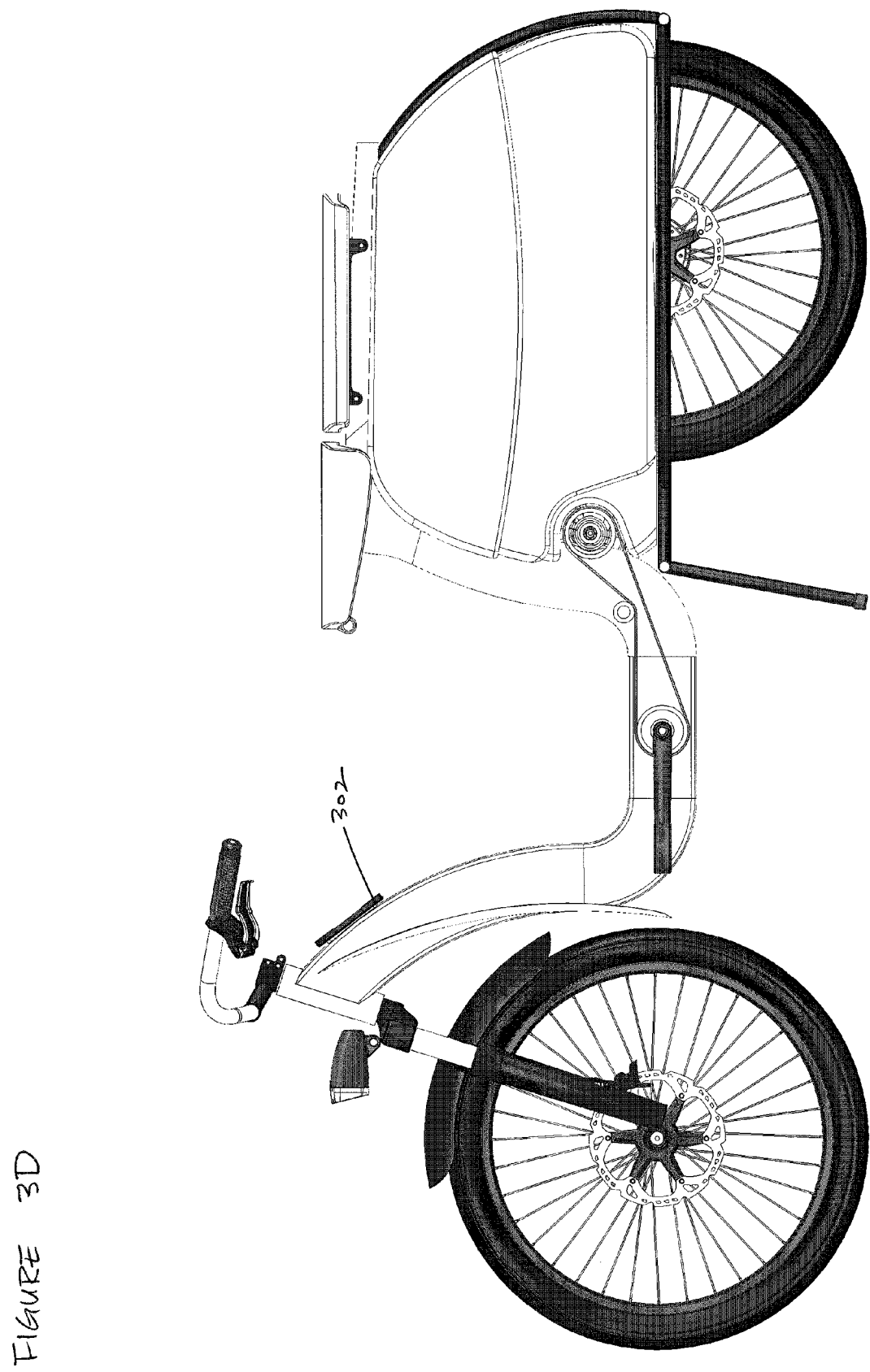

VERSATILE ELECTRIC BICYCLE SYSTEMS

CROSS-REFERENCE TO RELATED APPLICATIONS

This application is a continuation of U.S. patent application Ser. No. 14/178,205, filed Feb. 11, 2014, which is a continuation of PCT Application No. PCT/US2013/060706, filed Sep. 19, 2013, which claims the benefit of U.S. Provisional Application No. 61/704,375, filed Sep. 21, 2012. Each of the foregoing applications is hereby incorporated herein by reference in its entirety.

BACKGROUND

1. Field

Embodiments relate to the field of bicycles, and, in particular, to improved designs for versatile electric bicycles.

2. Description

With the development of new technologies, various types and kinds of electric bicycles are available today that can operate on electric and/or manual power. Many different types of electric bicycles are available and comprise various types of parts, such as motors and batteries, customized for different laws and regulations of each jurisdiction. Most electric bicycles are quite particular and lack compatibility or flexibility. For example, a certain electric bicycle can be restricted to be used in conjunction with certain parts, certain configurations, and/or within certain jurisdictions only. In other words, the electric bicycle industry lacks any standard or base model that can easily be adapted to accommodate different regulations, different parts, and/or different configurations. Further, the same electric bicycle may be considered by law a bicycle, a moped, a motor assisted cycle, or a motorcycle depending on jurisdiction and specification. The most common jurisdictional variations are total power permitted, top speed permitted, and whether the motor is controlled by a hand throttle or by pedal input.

SUMMARY

Advancements in technology make it possible to develop systems of a versatile electric bicycle that are adaptable to accommodate different parts, including motors and batteries, seat configurations, and laws of different jurisdictions.

In one embodiment, a system for controlling an electric bicycle having a motor comprises a user access point unit configured to receive a user input for controlling the electric bicycle, and an electric bicycle computing unit configured to control performance characteristics of the electric bicycle. The electric bicycle computing unit may control the electric bicycle based on the received user input, such that the performance characteristics of the electric bicycle comply with regulations of a first jurisdiction encompassing a current location of the electric bicycle. In one embodiment, the electric bicycle computing unit may communicate with a main computing system which maintains a regulations database to retrieve the regulations of the first jurisdiction encompassing the current location of the electric bicycle and automatically configure the electric bicycle to comply with the retrieved regulations. In another embodiment, the user access point unit may communicate with a main computing system which maintains a regulations database to retrieve the regulations of the first jurisdiction encompassing the current location of the electric bicycle and transmit the retrieved regulations to the electric bicycle computing unit, and electric bicycle computing unit may automatically configure the electric bicycle to comply with the regulations transmitted by the user access point unit.

In some embodiments, the current location of the electric bicycle may be automatically determined, without any user input, based on location information provided by a GPS module configured to determine location information. Alternatively, in other embodiments, the current location of the electric bicycle may be determined based on the user input specifying a location.

In some embodiments, the user access point unit may allow the user to specify one or more control parameters for controlling the electric bicycle. The one or more control parameters may be one or more of (i) pedal assist or power on demand modes of power application, (ii) a power output of the motor, (iii) a top speed of the electric bicycle, (iv) a maximum torque of the motor, and (v) a brake ON or OFF status.

In some embodiments, the electric bicycle computing unit may detect a change in the current location of the electric bicycle causing the current location to be encompassed by a second jurisdiction different from the first jurisdiction, and automatically configure the electric bicycle to comply with regulations of the second jurisdiction In some embodiments, the electric bicycle may further comprise power control module for controlling the power output of the motor of the electric bicycle, a GPS module for detecting a current location of the electric bicycle, a speed detection module for detecting a current speed of the electric bicycle, a navigation module for providing directions to the user, and/or a battery level detection module for monitoring a current battery level by communicating with one or more battery sensors.

In some embodiments, the user input may include user selection of a riding mode specifying how the electric bicycle is to be used. Based on the user selection, the electric bicycle computing unit may control the electric bicycle according to the selected riding mode. For example, (1) in a case that the riding mode is a bicycle mode, the electric bicycle computing unit turns off the motor of the electric bicycle such that the electric bicycle is driven solely by pedaling, (2) in a case that the riding mode is a moped mode, the electric bicycle computing unit caps the performance of the motor of the electric bicycle based on the regulations of the first jurisdiction, and (3) in a case that the riding mode is an off-road-only mode, the electric bicycle computing unit allows the motor of the electric bicycle to perform in an uninhibited manner.

In some embodiments, the electric bicycle computing unit may be configured to unlock the electric bicycle when a valid connection is established between the electric bicycle computing unit, and lock the electric bicycle when the valid connection is terminated.

In some embodiments, an electric bicycle may comprise a frame and a side bag having a semi-rigid outer shell. The side bag may be connected to the frame with an elastic material that holds the shell tight to the frame when the side bag is not full and holds the shell tight to the cargo inside the side bag when the side bag is full.

In some embodiments, the side bag is waterproof, cut resistant, permanently fixed to the frame, and/or has one or more additional pockets for holding batteries, controllers, bicycle locks and/or helmets. In some embodiments, a bag or compartment for holding one or more batteries may comprise a connector mechanism for connecting at least one battery of said one or more batteries to the electric bicycle such that the motor is powered by said at least one battery.

BRIEF DESCRIPTION OF THE DRAWINGS

The foregoing and other features, aspects and advantages are described in detail below with reference to the drawings of various embodiments, which are intended to illustrate and not to limit the disclosure. The drawings comprise the following figures in which:

FIGS. 1A-1G depict an example of one embodiment of an electric bicycle with a wave seat configuration that allows for multiple seat positions.

FIGS. 2A-2G depict an example of one embodiment of an electric bicycle with one or more bags covering the rear wheel.

FIGS. 3C-3I depict an example of one embodiment of an electric bicycle with a user access point system integrated to the electric bicycle.

FIGS. 4A-4G depict drivetrain layout features of an example of one embodiment of an electric bicycle.

DETAILED DESCRIPTION

Figure 1A:
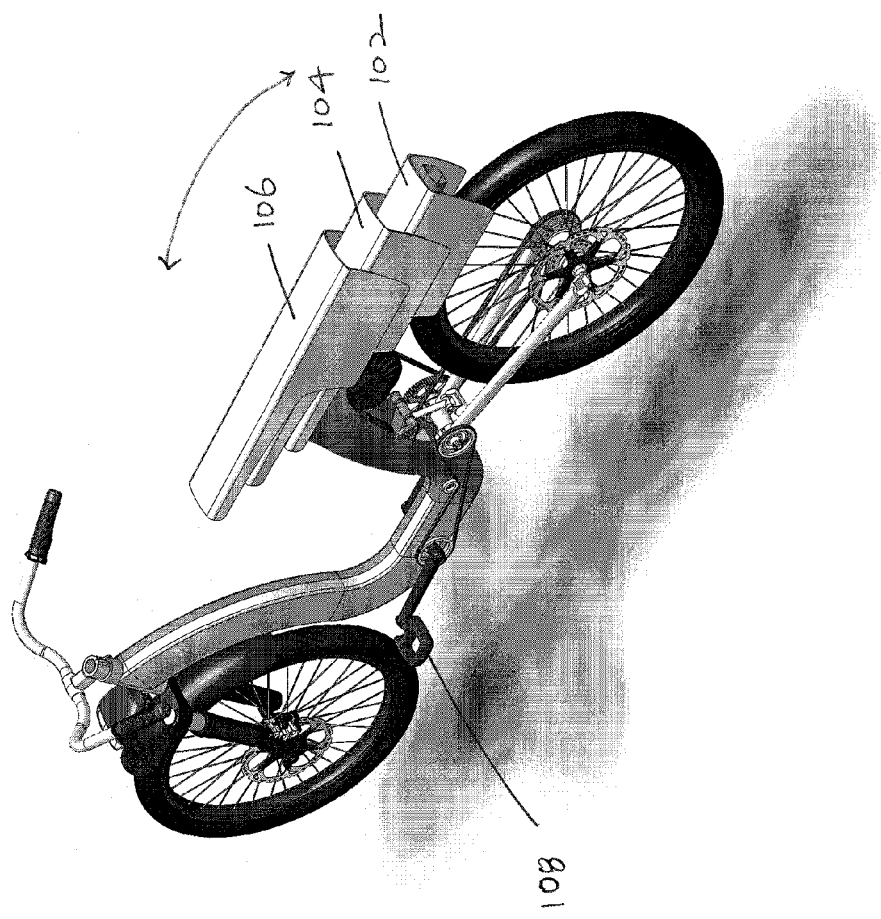
Figure 1B:
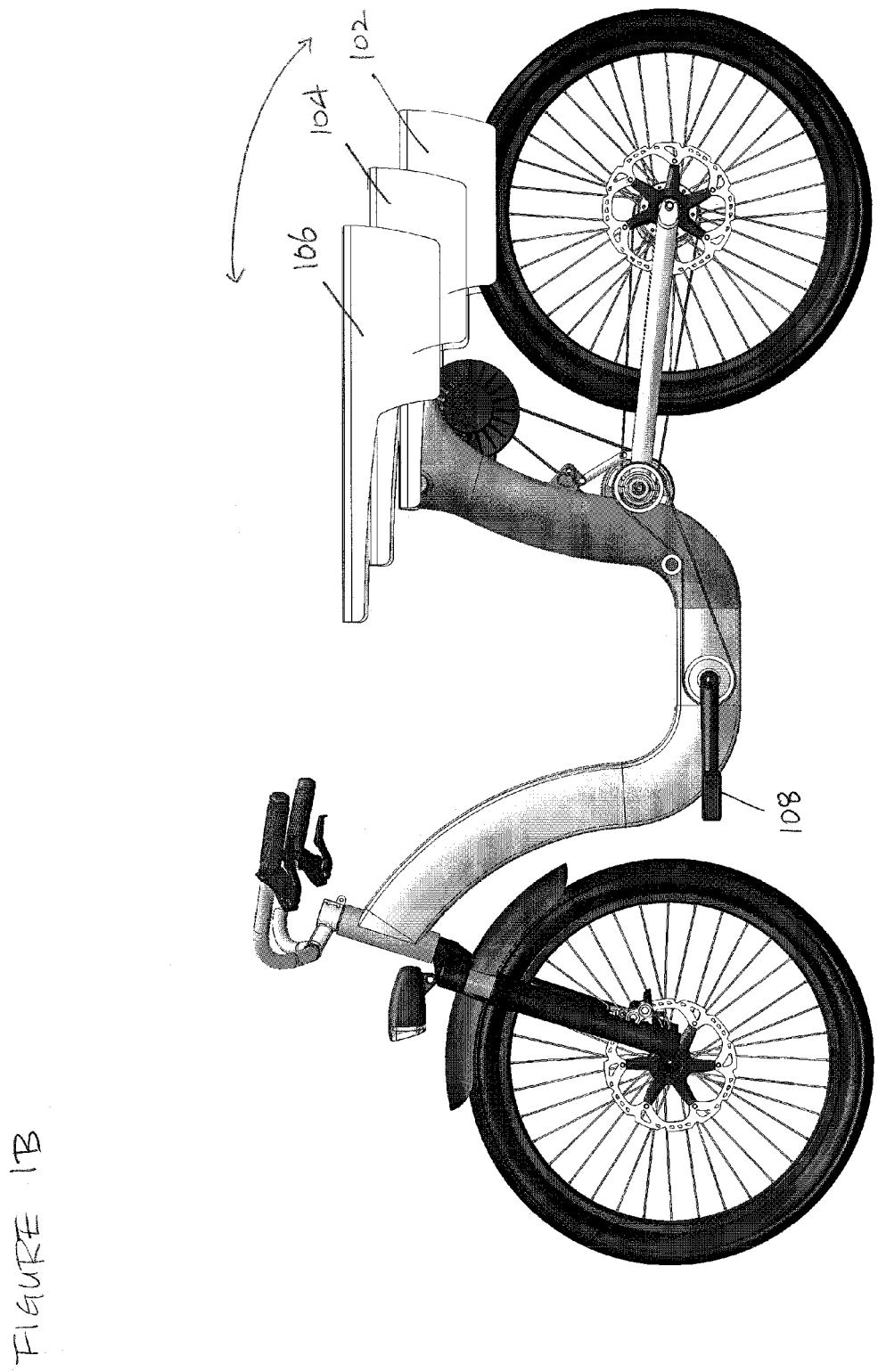
Figure 1C:
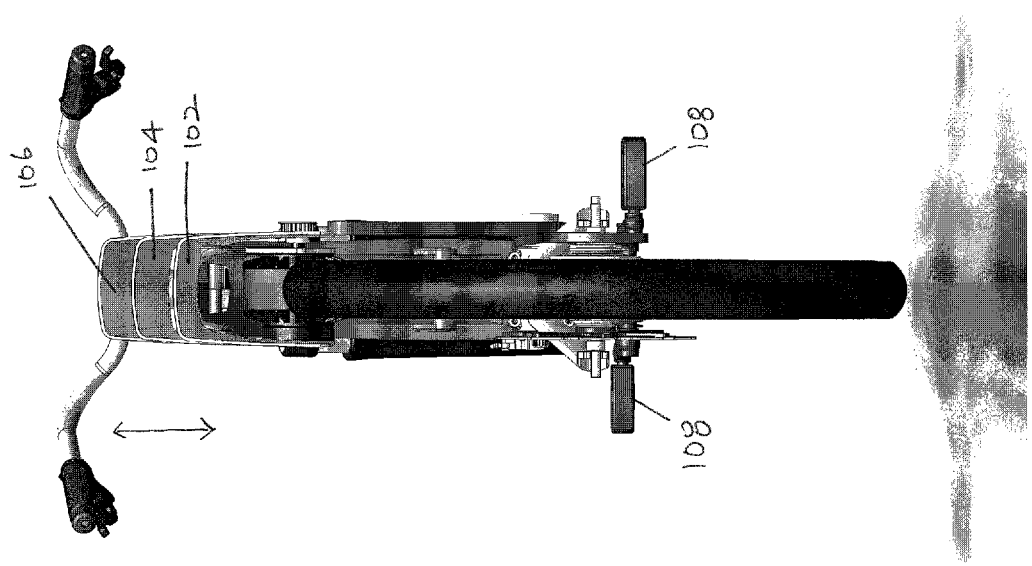
Figure 1D:
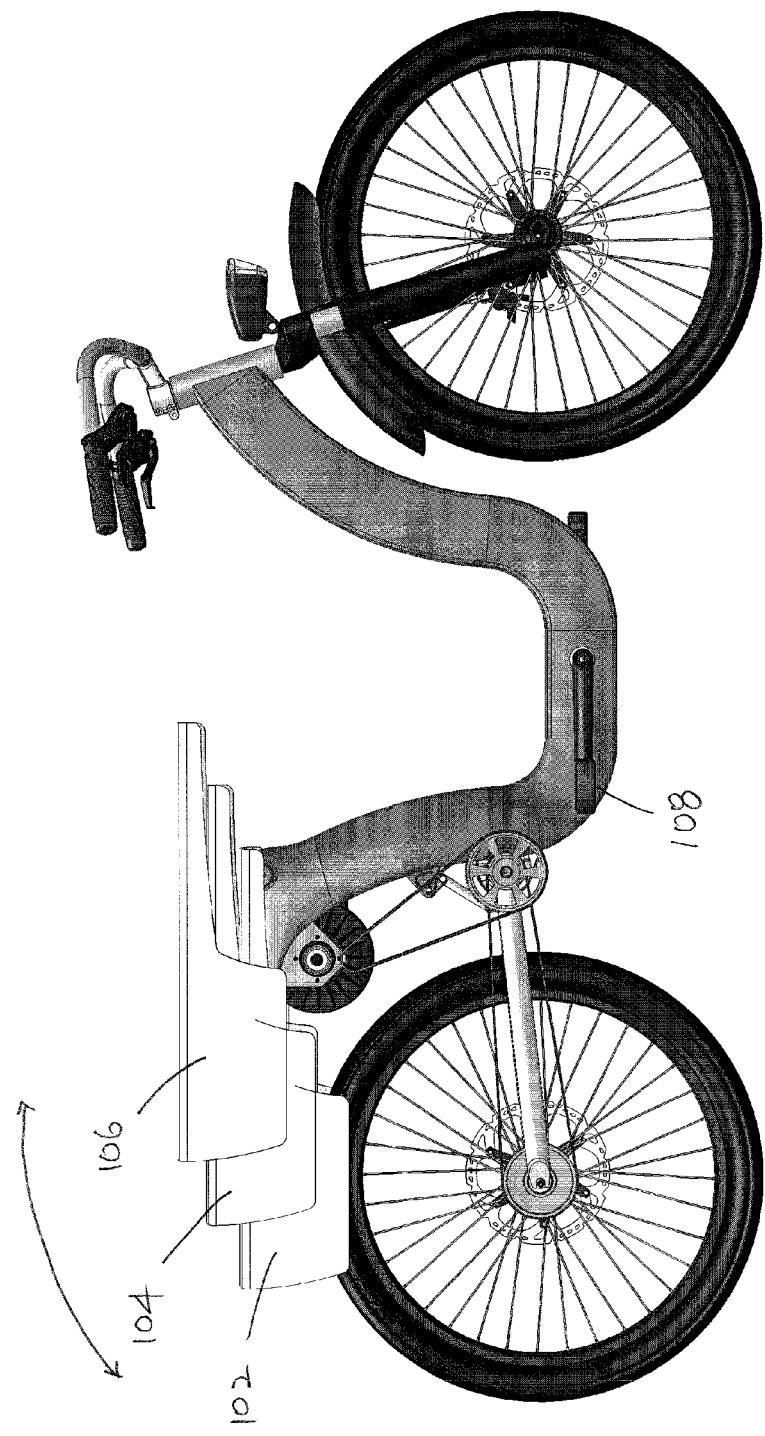
Figure 1E:
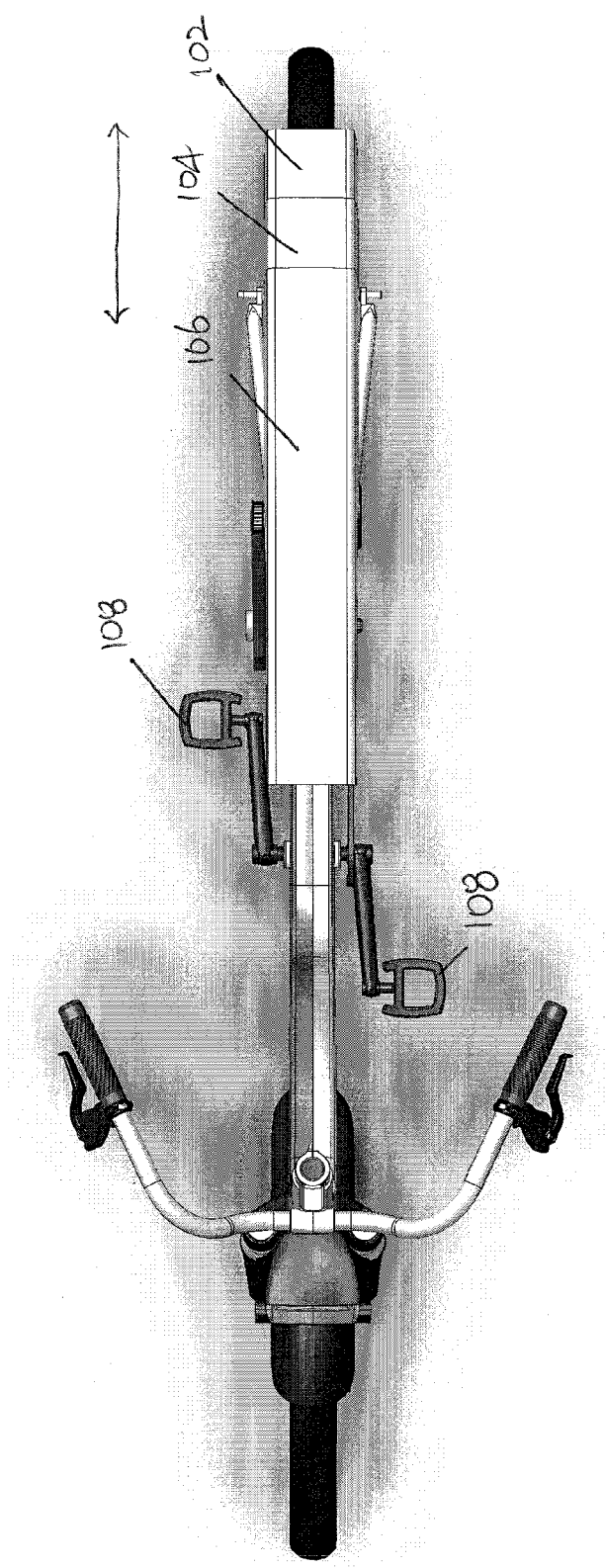
Figure 1F:
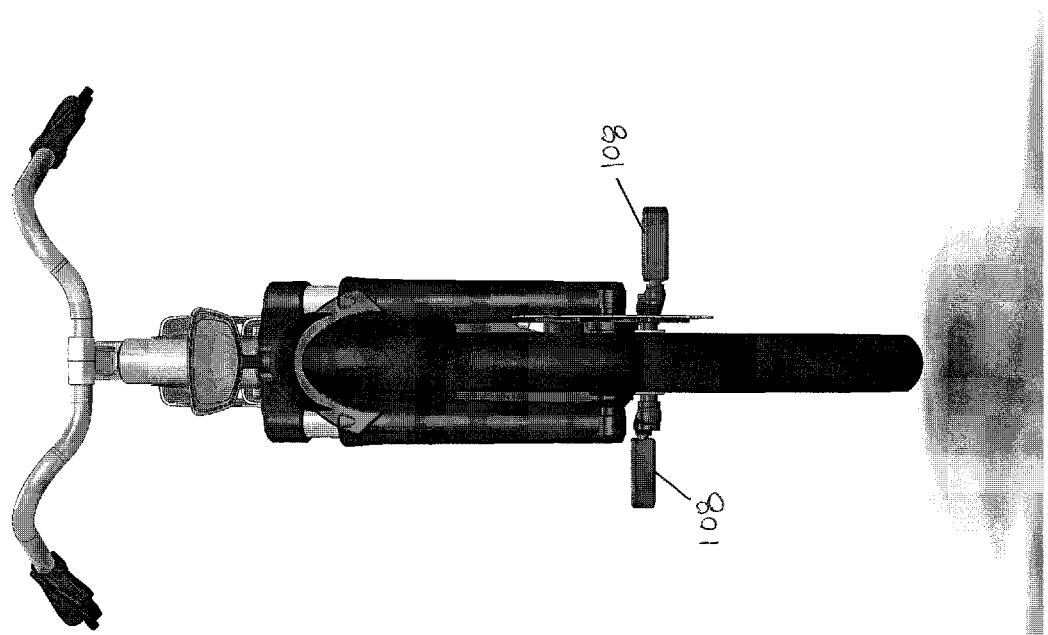
Figure 14:
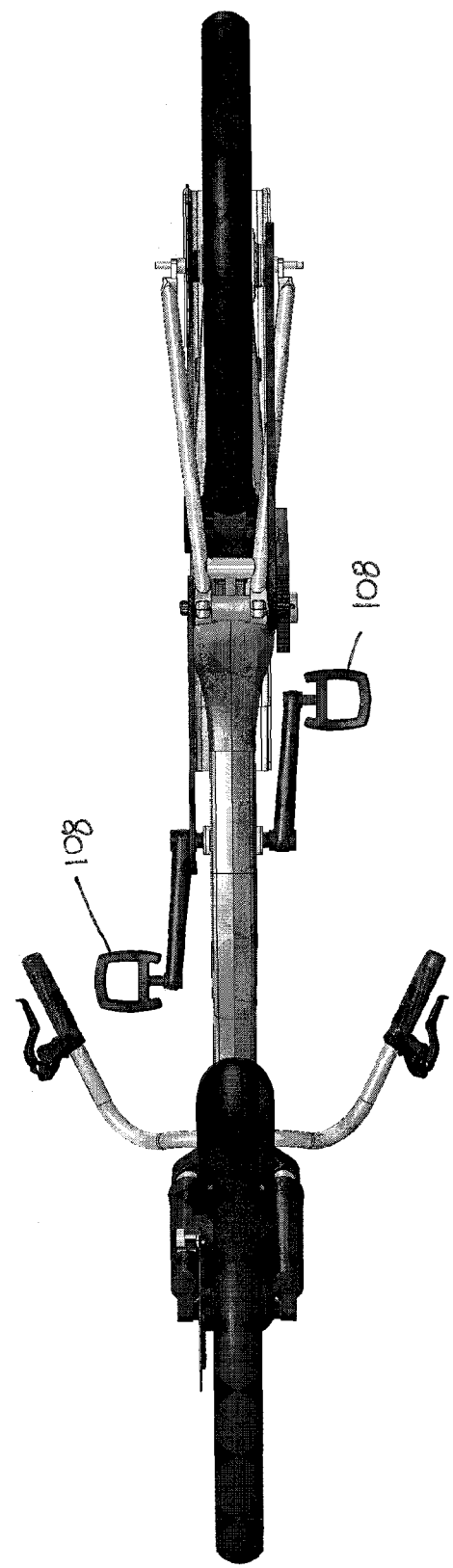
Figure 2A:
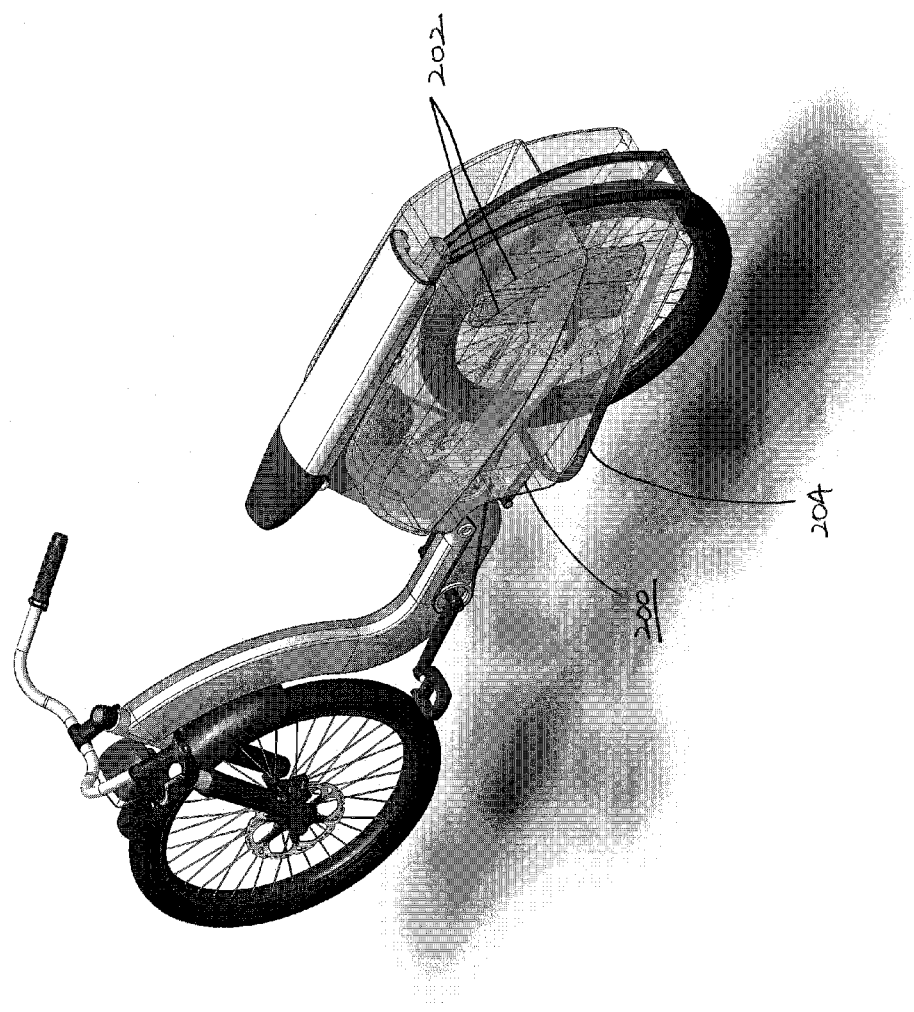
Figure 2B:
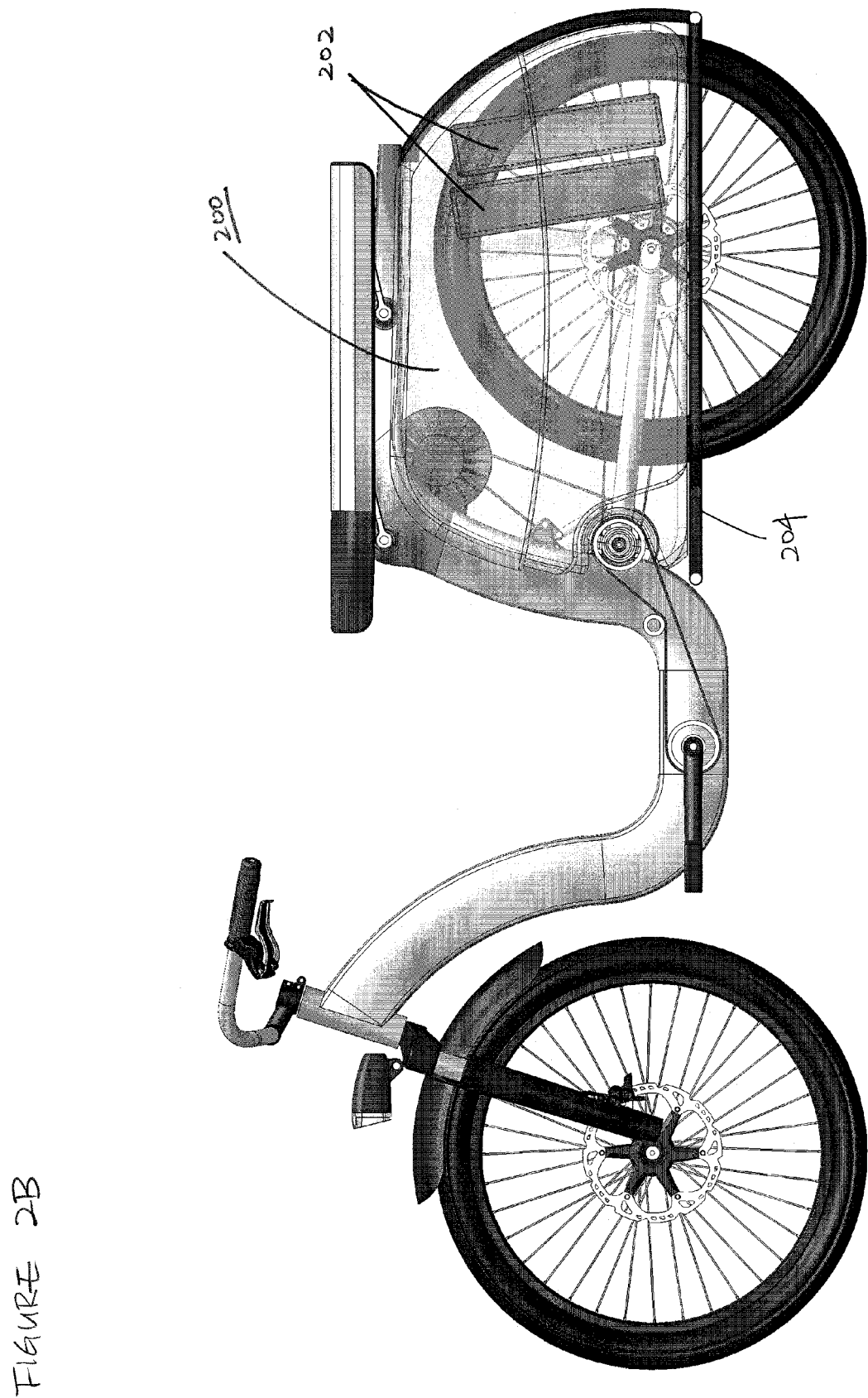
Figure 2C:
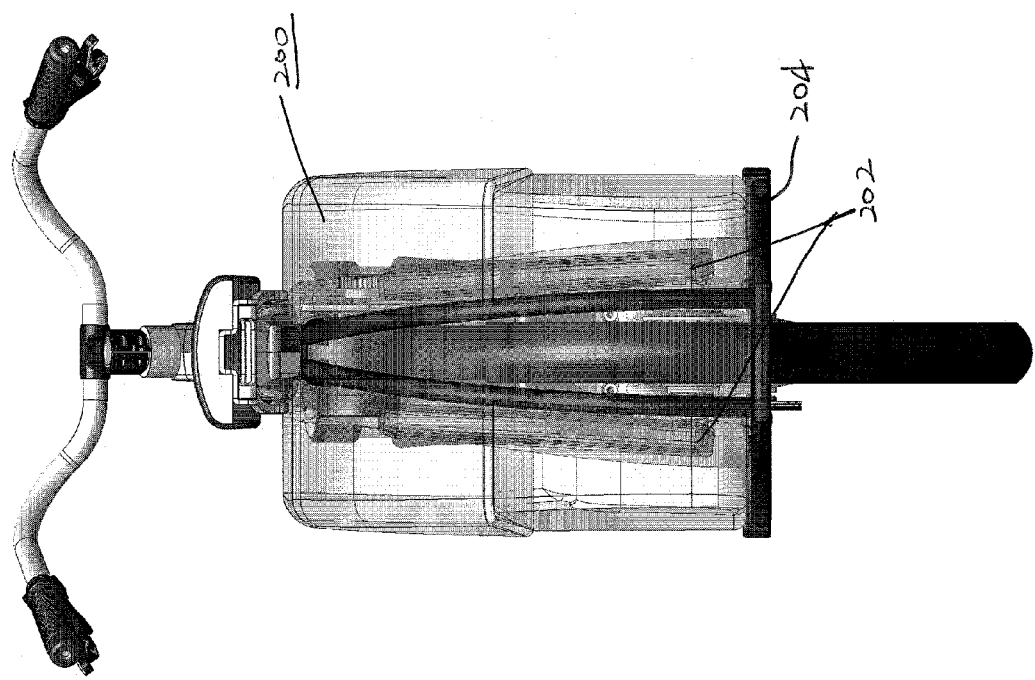
Figure 2F:
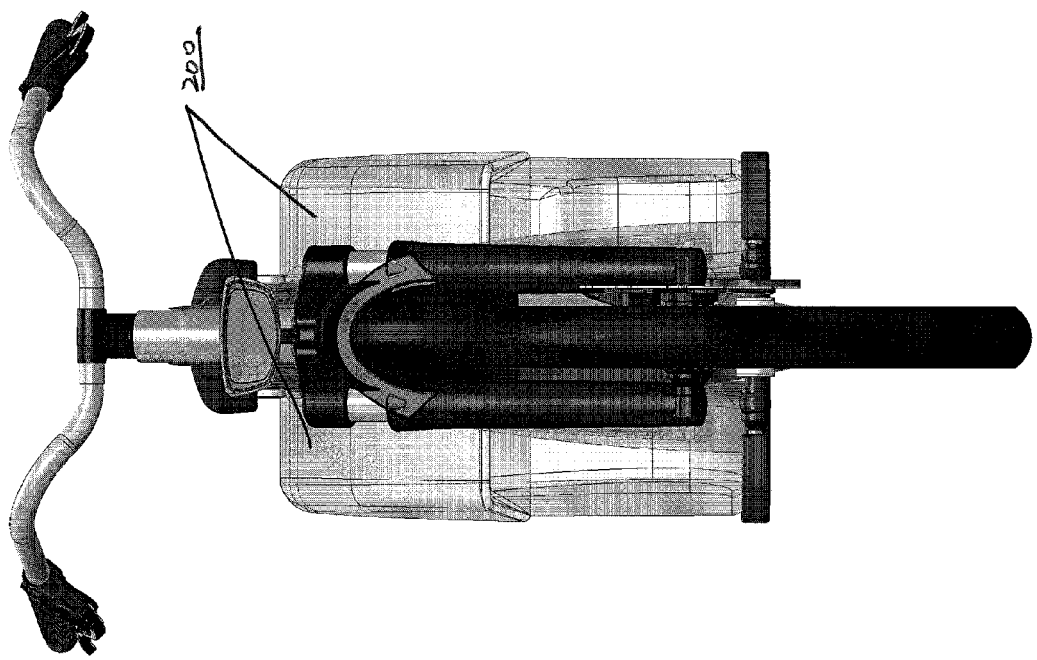
Figure 26:
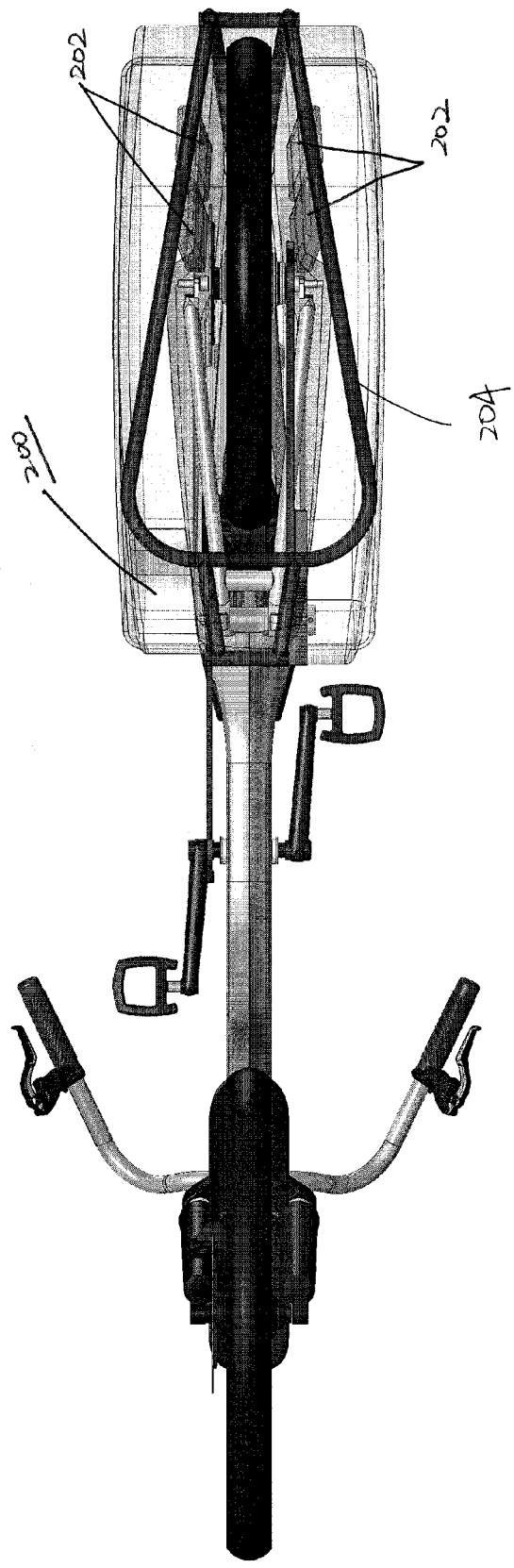

Embodiments will now be described with reference to the accompanying figures. The terminology used in the description presented herein is not intended to be interpreted in any limited or restrictive manner, simply because it is being utilized in conjunction with a detailed description of certain specific embodiments. Furthermore, embodiments may comprise several novel features, no single one of which is solely responsible for its desirable attributes or which is essential to practicing the embodiments herein described.

The disclosure herein provides improved systems for a versatile electric bicycle that is flexible and easily adaptable to accommodate various needs and requirements. In general, most electric bicycles available today are restricted and/or designed to be used with particular parts, such as motors and/or batteries. Further, most electric bicycles are confined to a particular seating configuration and/or are not easily transferable across different jurisdictions due to varying regulations and laws that control the electric bicycle industry. However, the embodiments of a versatile electric bicycle disclosed herein provide standard features and/or models that are configured to be easily adapted to accommodate parts of varying dimensions, different seating configurations, and/or particular laws and regulations of different jurisdictions. Further, due to its flexibility, embodiments of an electric bicycle disclosed herein are durable and timeless as the motor, battery, and/or other parts of the electric bicycle can be easily upgraded and replaced.

The term "electric bicycle" used in the present disclosure may refer to any of electric bicycles, electric assist bicycles, mopeds and other "limited use vehicles" as defined by law (for example, a two- or three-wheeled cycle that can go faster than 30 mph and reach a top speed of 40 mph). However, the term is not limited to such examples, and may include other similar devices currently existing or to be developed in the future.

Frame Design

In an embodiment, an electric bicycle comprises an ergonomically designed frame. In some embodiments, the electric bicycle comprises a step-through frame.

Wave Seat Configuration

In general, electric bicycles can either be powered manually by pedaling or electrically by an electric motor. When an electric bicycle is powered by the electric motor, the rider may prefer to sit lower and further back for a more comfortable position while cruising. Also, it may be preferable for the rider to be able to lay his or her feet flat on the ground when the electric bicycle is stopped. Alternatively, a rider may choose to manually pedal the electric bicycle in some situations, such as when the batteries are out of power or when the motor is not providing enough power and/or speed. When pedaling, a rider may prefer to sit or stand substantially above the pedals for a more dynamic riding configuration. As such, due to differences in physical action of the two options, different riding and/or seating positions can be preferred depending on how the electric bicycle is being powered.

In an embodiment, an electric bicycle can have one or more seating positions that can be selected by the rider to accommodate different seating preferences. FIGS. 1A-1G illustrate an example of an embodiment of an electric bicycle with multiple seating positions or a wave seat configuration. In the depicted embodiment, an electric bicycle comprises multiple seating positions including at least Position A 102, Position B 104, and Position C 106.

Position A 102 is relatively low and is positioned away from the front of the bicycle. The pedals 108 are generally located further forward than the seat position. Position A 102 can be selected when the electric motor is powering the electric bicycle, although it may be selected for manual pedaling as well. When the electric bicycle is in Position A 102, a rider can sit back in a cruising position as the electric motor powers the bicycle. Also, in some embodiments, Position A 102 is sufficiently low as to allow a rider to rest the rider's feet flat on the ground when the bicycle is not moving.

Position C 106 is higher in height and is closer to the front of the bicycle compared to Position A 102. When a rider is actively pedaling the electric bicycle, the user may select Position C 106 of the seating positions. This allows for the rider to sit or stand substantially above the pedals 108 to allow for more power and a more dynamic riding position.

Position B 104 is between Position A 102 and Position C 106, both in height and in distance from the front of the bicycle. Position B 104 can be selected depending on the personal preference of the rider and/or riding condition, such as the steepness of terrain.

In other embodiments, any number of seating positions that differ in height and in distance from the front of the bicycle may be selected. A plurality of seating positions may accommodate riders of different heights and/or with different uses or preferences. In some embodiments, the different possible positions may be along a straight line. In other embodiments, the different possible positions may be along an arc. That is, the seat may trace a straight line shape or an arc shape when switched between the various positions. In other embodiments, the seat may trace any shaped line when switched between positions. Further, for whatever path the seat traces, any number of possible positions may be used in between the two extreme positions A 102 and C 106.

In some embodiments, the seat may be rotated about an axis perpendicular to the bicycle frame plane. This plane contains the frame of the bicycle, thus such an axis would be approximately parallel to a wheel axis. This is the equivalent of a "pitch" type of rotation. Thus, such rotation of the seat allows the rider to either pitch up or pitch down. For example, when in back position A 102 a rider may elect to pitch up so that, relative to a level seat, the front portion of the seat moves up and the back portion of the seat moves down. Conversely, when in forward position 106, a rider may elect to pitch down, so that the front portion of the seat moves down and the back portion of the seat moves up relative to a level seat. Depending on the shape of the seat, the front portion of the seat may be higher or lower than the back portion of the seat when pitched in either direction.

In some embodiments, the traced shape of the seat may be translated or moved. For example, for a given starting position at position A 102 and given a shape to trace, the positions B 104 and C 106 are thus defined in space. However, all three positions, or however many positions an embodiment has, may be moved together. For example, a different starting position at position A 102 may be used. Suppose position A 102 is moved up and back by a certain distance. This will in turn translate or move the shape that the seat traces up and back by the same distance, thus moving position B 104 and C 106 up and back by the same distance. In this manner, different sized riders may adjust the seat so that the various positions result in optimal configurations. For instance, a short rider may want positions that will be closer to the ground, while a tall rider may want positions higher up. These riders can adjust the seat accordingly so that all possible positions are relatively lower or higher, respectively, than they otherwise would be. The translation or movement of the traced shape may also be further forward or backward, or any combination of forward/backward and up/down.

In certain embodiments, the seat is configured to be switched between one or more seating configurations via an ottoman bracket and/or an L-shaped bracket. In some embodiments, the ottoman bracket and/or L-shaped bracket can comprise one or more holes that allow for one or more seat configurations. In certain embodiments, the seat is configured to be manually adjusted and locked into a particular position. In other embodiments, the seat is configured to be automatically moved and locked into a preferable position via a button or other input that a rider can select.

In some embodiments, the vertical distance of the seat from the bottom of the wheels can be adjusted from about 25 inches to about 45 inches or any other range. For example, depending on the seat configuration, the vertical distance of the seat from the bottom of the wheels can be about 25 inches, 26 inches, 27 inches, 28 inches, 29 inches, 30 inches, 31 inches, 32 inches, 33 inches, 34 inches, 35 inches, 36 inches, 37 inches, 38 inches, 39 inches, 40 inches, 41 inches, 42 inches, 43 inches, 44 inches, 45 inches, or any other height.

In certain embodiments, the horizontal distance from the front of the seat to the handles of the electric bicycle can be adjusted from about 10 inches to about 25 inches or any other range. For example, depending on the seat configuration, the horizontal distance from the front of the seat to the handles of the electric bicycle can be about 10 inches, 11 inches, 12 inches, 13 inches, 14 inches, 15 inches, 16 inches, 17 inches, 18 inches, 19 inches, 20 inches, 21 inches, 22 inches, 23 inches, 24 inches, 25 inches, or any other distance.

Bag(s) Configuration

In an embodiment, an electric bicycle comprises one or more bags configured to hold cargo or any other item(s).

FIGS. 2A-2G illustrate an example of an embodiment of an electric bicycle comprising one or more bags.

In an embodiment, one or more bags 200 are located in the rear of the electric bicycle. In some embodiments, the one or more bags 200 are permanently or semi-permanently integrated to the electric bicycle. In other embodiments, the one or more bags 200 or parts thereof are selectively removable from the electric bicycle.

In some embodiments, the one or more bags 200 cover the rear wheel or portions thereof, providing a protective cover for the rear wheel. By covering the rear wheel or portions thereof, the one or more bags 200 can reduce exposure of the rider and/or rear wheel to dirt or other debris. The one or more bags 200 can also function as a protective layer for the rear wheel against shock or damage.

In some embodiments, the one or more bags 200 comprise a hard shell and/or soft compartment or pouch. The hard shell or structure can be made of any type of hard material, such as a hard plastic for example. The hard shell can provide a rigid structure to the one or more bags 200 such that the one or more bags 200 can maintain a certain form and/or shape. Also, the hard shell can prevent the one or more bags 200 from poking into the rear wheel frame.

In some embodiments, the one or more bags 200 comprise a semi-rigid outer shell connected to a main body of the bag with an elastic material. The elastic material can be configured to hold the outer shell tight or close to the body when the bag is not full, and to hold the shell tight to cargo placed within the bag when the bag is full or partially full. In some embodiments, the bags 200 are configured to be waterproof and/or cut resistant. In some embodiments, the bags 200 are permanently fixed to the bicycle frame or removably attached to the bicycle frame. In some embodiments, as further described below, the bags 200 may comprise one or more internal or external pockets for holding various items, such as, for example, batteries, a controller, and/or dirty locks. In some embodiments, one or more pockets are specially configured to hold a particular item, such as a battery, controller, dirty locks, and/or the like. For example, a special pocket for holding a dirty lock may comprise waterproof or other materials and/or a seal to reduce a risk of transferring dirt, contaminants, and/or moisture from the lock to other items within the bag.

The soft compartment or pouch can be made of any soft material, such as any type of fabric, soft plastic, canvas, leather, or any other appropriate material or trim. The soft compartment or pouch can be flexible in some embodiments to be able to carry a wide variety of items in size and dimension. In certain embodiments, when empty, the soft compartment or pouch collapses to lay flat against the hard shell and closer to the rear wheel. This can allow for a more aerodynamic configuration of the electric bicycle. In contrast, in certain embodiments, when one or more items are placed in the soft compartment or pouch, the soft compartment or pouch can expand while being supported by the hard shell.

In certain embodiments, an electric bicycle comprises a platform 204. The platform 204 can be configured to be used for resting a rider's feet and/or for providing support for the soft compartment or pouch.

Dedicated Pockets

In some embodiments, the one or more bags 200 comprise one or more compartments or pouches that are dedicated for particular items. For example, in certain embodiments, the one or more bags 200 can comprise one or more dedicated battery pouches or compartments 202 for battery mounting and suspension on one or both sides of the electric bicycle. In other embodiments, the one or more bags 200 can comprise one or more dedicated compartments or pouches for a bicycle lock and/or helmet. For example, the one or more bags 200 may be used to hold or store dirty locks.

In certain embodiments, the one or more bags 200 comprise a plurality of dedicated battery compartments 202 in various locations. In some embodiments, the compartments 202 are on one or both sides of the bags 200. In other embodiments, the compartments may be, instead or in addition to being on the sides, on the back end of the bags 200 that is farthest from the handles on the bike. Still in other embodiments, the compartments 202 may be on a front side of the bags 200 that is farthest toward the handles of the bike. Or the compartments 202 may be in any combination of front, side, and/or back locations on the bags 200. The compartments 202 may further by located in any of these positions on both or either the exterior of the bags 200 and/or the interior of the bags 200. In some embodiments, the bags 200 may also include covers to protect the bags 200 from the elements and/or hide the bags 200 from view for security purposes.

In certain embodiments, the one or more bags 200 comprise a plurality of dedicated battery compartments 202 of various shapes and sizes to accommodate batteries of various shapes and sizes. In some embodiments, the battery compartments 202 are substantially rectangular in shape and are configured to hold a plurality of batteries shaped approximately like a brick and of various sizes. For instance, the compartments 202 may be configured to hold batteries approximately shaped like a brick and/or rectangle with width, depth, and length dimensions, respectively, of about 3.375 inches by about 2.625 inches by about 10.250 inches. Other possible width dimensions include about 0.5 inches, about 1 inch, about 1.5 inches, about 2 inches, about 2.5 inches, about 3 inches, about 3.5 inches, about 4 inches, about 4.5 inches, about 5 inches, about 5.5 inches, or about 6 inches, or any other width. Other possible depth dimensions include about 0.5 inches, about 1 inch, about 1.5 inches, about 2 inches, about 2.5 inches, about 3 inches, about 3.5 inches, or about 4 inches, about 4.5 inches, about 5 inches, about 5.5 inches, or about 6 inches, or any other depth. Other possible length dimensions include about 0.5 inches, about 1 inch, about 1.5 inches, about 2 inches, about 2.5 inches, about 3 inches, about 3.5 inches, about 4 inches, about 4.5 inches, about 5 inches, about 5.5 inches, about 6 inches, about 6.5 inches, about 7 inches, about 7.5 inches, about 8 inches, about 8.5 inches, about 9 inches, about 9.5 inches, about 10 inches, about 10.5 inches, about 11 inches, about 11.5 inches, about 12 inches, about 12.5 inches, about 13 inches, about 13.5 inches, about 14 inches, about 14.5 inches, about 15 inches, about 15.5 inches, about 16 inches, about 16.5 inches, about 17 inches, about 17.5 inches, or about 18 inches, or any other depth.

The compartments 202 may be sized to accommodate a single size and shape of battery or the compartments 202 may be sized to accommodate many ranges of battery sizes and shapes. In other embodiments, the battery compartments 202 are substantially square, circular, and/or oval in shape, and/or any other shape, whether typical or atypical.

Square-shaped compartments may have length and width dimensions of about 0.5 inches, about 1 inch, about 1.5 inches, about 2 inches, about 2.5 inches, about 3 inches, about 3.5 inches, about 4 inches, about 4.5 inches, about 5 inches, about 5.5 inches, about 6 inches, about 6.5 inches, about 7 inches, about 7.5 inches, about 8 inches, about 8.5 inches, about 9 inches, about 9.5 inches, about 10 inches, about 10.5 inches, about 11 inches, about 11.5 inches, about 12 inches, about 12.5 inches, about 13 inches, about 13.5 inches, about 14 inches, about 14.5 inches, about 15 inches, about 15.5 inches, about 16 inches, about 16.5 inches, about 17 inches, about 17.5 inches, or about 18 inches, or any other length and width. Square-shaped compartments 202 may have height dimensions of about 0.5 inches, about 1 inch, about 1.5 inches, about 2 inches, about 2.5 inches, about 3 inches, about 3.5 inches, about 4 inches, about 4.5 inches, about 5 inches, about 5.5 inches, about 6 inches, or any other height.

Circular-shaped or oval-shaped compartments 202 may have a minimum diameter and/or a height of about 0.5 inches, about 1 inch, about 1.5 inches, about 2 inches, about 2.5 inches, about 3 inches, about 3.5 inches, about 4 inches, about 4.5 inches, about 5 inches, about 5.5 inches, about 6 inches, about 6.5 inches, about 7 inches, about 7.5 inches, about 8 inches, about 8.5 inches, about 9 inches, about 9.5 inches, about 10 inches, about 10.5 inches, about 11 inches, about 11.5 inches, about 12 inches, about 12.5 inches, about 13 inches, about 13.5 inches, about 14 inches, about 14.5 inches, about 15 inches, about 15.5 inches, about 16 inches, about 16.5 inches, about 17 inches, about 17.5 inches, or about 18 inches, or any other diameter and/or height.

In certain embodiments, the dedicated battery compartments 202 are diagonal or substantially vertical in configuration with an opening at the top to allow for easy installation and removal while providing sufficient stability such that the battery does not fall out.

In some embodiments, an electric bicycle comprises a plurality of battery compartments 202 on one or multiple sides of the electric bicycle. For example, in some embodiments, one, two, or three battery compartments 202 may be located on each side of the electric bicycle. In other embodiments, more battery compartments 202 may be located on one side compared to another side. In certain embodiments, one or more battery compartments 202 may be located on only one side of the electric bicycle.

In some embodiments, a dedicated battery compartment(s) 202 further comprises a connector mechanism to connect the battery to the electric bicycle such that battery can power the electric motor. For example, a dedicated battery compartment(s) 202 can comprise a cradle, dock, cable(s), and/or pin(s) for connecting the battery to the electric bicycle. A battery compartment(s) 202 can also comprise any other battery connecting mechanism that is currently well-known or is to be developed in the future. In some embodiments, the battery connecting mechanism that connects the one or more batteries to the motor is protectively covered by the one or more bags 200.

In certain embodiments, unlike some other electric bicycles that are restricted to a proprietary battery, a number of different types of batteries can be installed. Dedicated battery compartments 202 of some embodiments are flexible in shape and/or size and can accommodate batteries with varying shapes and/or sizes. In addition, in certain embodiments, a dedicated battery compartment 202 can allow for simple installation and/or removal of batteries for recharging, replacing, and/or upgrading among other purposes.

The bags 200 and/or compartments 202 in some embodiments are aerodynamically shaped to minimize and/or lower drag on the bike when moving and thus increase efficiency of the electrical system. In other embodiments, the bags 200 and/or compartments 202 are bulkier and sacrifice aerodynamic efficiency for more storage space.

Vehicle Control System

Currently, different states and/or countries have different laws governing the use of electric bicycles. For example, the definition and/or restrictions of electric bicycles and their power can be different in each state and/or country. Laws regarding the maximum speed of electric bicycles can also be different. For example, the U.S. federal law defines and restricts electric bicycles to bicycles with electric motors of less than 750 Watts and with a top motor-powered speed of less than 20 miles per hour with a rider that weighs less than 170 pounds. In comparison, California restricts the maximum power output of electric bicycles to 1000 Watts, and Florida allows electric bicycles with a maximum power output of up to 5000 Watts.

Needless to say, the different laws and regulations of each jurisdiction create a challenge for electric bicycle manufacturers in creating a single product that complies with all such rules. One option for manufacturers is to develop a low-powered electric bicycle that complies with the regulations of all jurisdictions and can be sold everywhere. However, such electric bicycles are unnecessarily restricted in both power and/or speed and consequently may not appeal to consumers thereby hindering sales. Another option is to develop customized electric bicycle products for each jurisdiction to maximize the power and/or speed allowed by the laws of each jurisdiction. However, this option inherently leads to high costs in design and manufacturing of multiple models.

As an alternative to developing a sufficiently low-powered electric bicycle to comply with all state regulations or developing customized electric bicycles per jurisdiction, an embodiment of an electric bicycle as disclosed herein uses software and a computer system(s) to control the maximum power output and/or speed within the regulations of each jurisdiction. In other words, in some embodiments, an electric bicycle with hardware specifications above the regulations of one or more jurisdictions is adaptable to such regulations via software and a computer system(s). Such electric bicycles can maximize the power and/or speed limits allowable by the laws of each jurisdiction. In this way, a manufacturer of an electric bicycle only needs to design, build, and market one electric bicycle product for a plurality of jurisdictions as long as the software and computer system(s) can limit the maximum power and/or speed output of the electric motor within each jurisdiction's regulations.

Figure 3A:
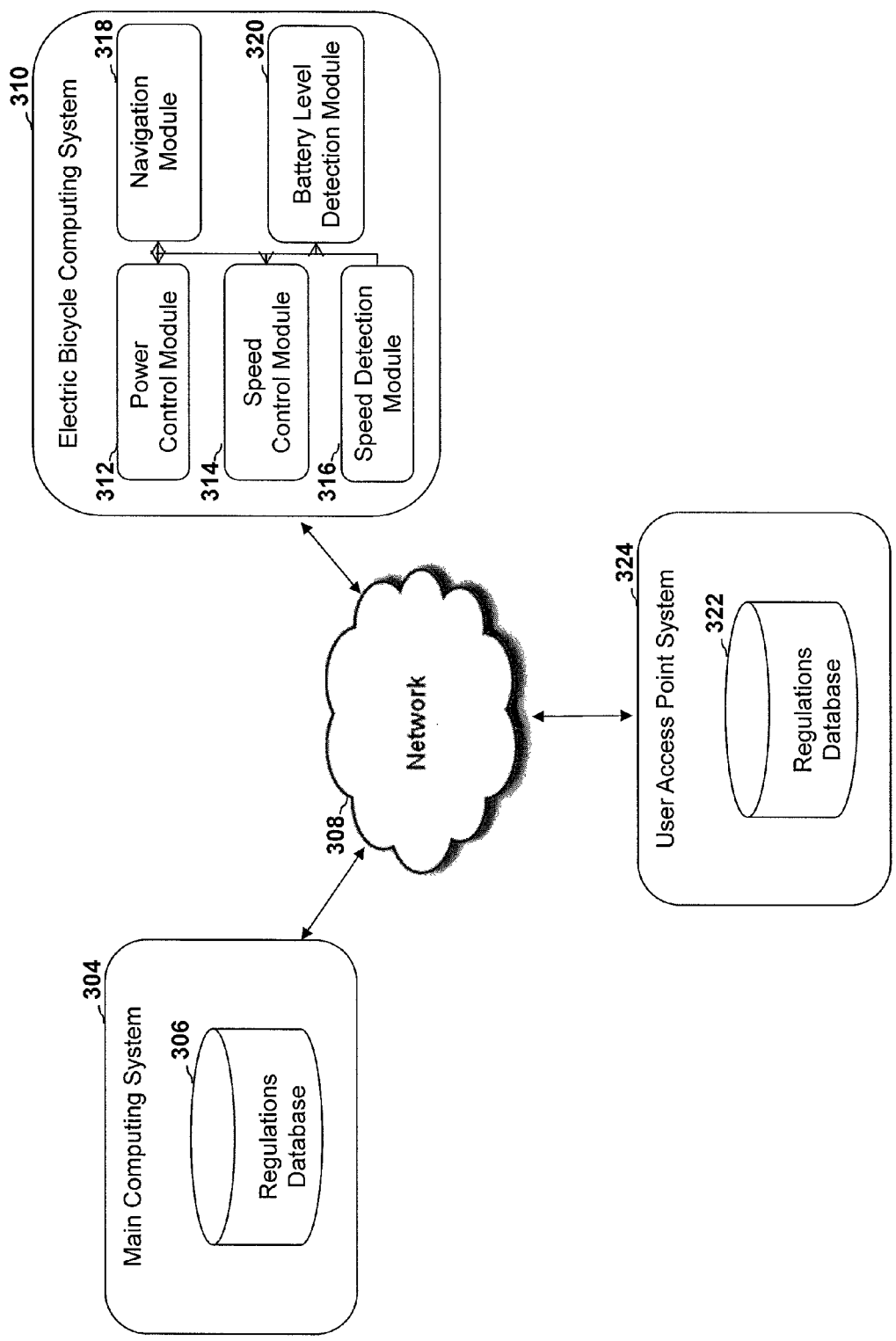
FIG. 3A is a block diagram depicting a high level overview of one embodiment of a system for controlling the maximum output of a motor of an electric bicycle.

FIG. 3A is a block diagram illustrating a high level overview of one embodiment of a system for controlling the output of an electric bicycle's motor within a jurisdiction's regulations. In an embodiment, a main computing system 304, an electric bicycle computing system 310, and/or a user access point system 324 can be in communication over a network 308 to control the output of an electric bicycle's motor. For example, in some embodiments, a main computing system 304, an electric bicycle computing system 310, and/or a user access point system 324 are configured to control the performance characteristics of an electric bicycle such that the performance characteristics comply with a particular jurisdiction or government's regulations and requirements. In certain embodiments, appropriate software configured to be used in conjunction with the system to control and/or monitor an electric bicycle's performance can be purchased and/or downloaded for installation. For example, in some embodiments, software for a user access point system 324 can be downloaded and installed from a mobile app store.

In some embodiments, the system comprises a user access point system 324 configured to receive input from a rider and/or other user to specify one or more control parameters for controlling the electric bicycle. Such control parameters may include "pedal assist" or "power on demand" modes of power application (for example, pedal-assist mode in which the motor assists the rider based on the pressure of his or her pedaling, and power-on-demand mode in which the rider has control of the amount of power output by the motor), total power output (for example, in watts), top speed, maximum torque and/or brake on or off status. Additionally or alternatively, the system (for example, electric bicycle computing system 310) may be configured to determine one or more of such control parameters based on information provided by the user (for example, via the user access point system 324) and/or information retrieved from one or more internal or external databases (for example, regulations databases 306 or 322). For example, in certain embodiments, the rider and/or other user can input a maximum speed and/or power value for the motor. In other embodiments, the rider and/or other user can input and/or select the state or other jurisdiction where the electric bicycle is located, and the system can be configured to automatically configure the one or more control parameters such that the electric bicycle complies with the regulations of the particular state or jurisdiction. In some embodiments, the system can be configured to automatically detect the appropriate state or other jurisdiction, without requiring a user to manually input and/or select a state or other jurisdiction. For example, as further described below, the system can be configured to utilize a GPS module to detect the bike's location.

In some embodiments, the user access point system 324 determines the maximum speed and/or power output allowable under the appropriate regulations of the selected jurisdiction based on a regulations database 322 of the user access point system 324. In other embodiments, the user access point system 324 communicates with a main computing system 304 comprising a regulations database 306 to determine the maximum speed and/or power output allowable under the appropriate regulations of the selected jurisdiction. Regulations related to electric bicycles, maximum allowable power and/or speed of electric bicycles, and/or other related information can be stored in the regulations database 306, 322. The user access point system 324 and/or main computing system 304 can be configured to periodically update the one or more regulations databases 306, 322 by communicating with one or more other computing systems and/or databases.

In certain embodiments, a GPS module is configured to detect the current location of the electric bicycle and electronically transmit the location to the user access point system 324, electric bicycle computing system 310, and/or main computing system 304. Based on the detected location, the user access point system 324, electric bicycle computing system 310, and/or main computing system 304 can automatically access the regulations database and determine the maximum speed and/or power output allowed under the appropriate regulations of the jurisdiction where the electric bicycle is currently located. In some embodiments, the GPS module is configured to periodically check the location of the electric bicycle and electronically transmit the location to the user access point system 324, electric bicycle computing system 310, and/or main computing system 304. Based on the periodically updated location of the electric bicycle, the user access point system 324, electric bicycle computing system 310, and/or main computing system 304 can update the maximum speed and/or power output allowed under the regulations of a new jurisdiction when necessary due to the electric bicycle's movement. In some embodiments, the GPS module is part of a user's smartphone or other portable computing device. In some embodiments, in addition to, or in lieu of a GPS module, other locating or geolocation methods may be utilized, such as, for example, cellular phone tower triangulation, detection of Wi-Fi access points or other radio devices or broadcasts, and/or the like.

In some embodiments, an electric bicycle comprises an electric bicycle computing system 310. In certain embodiments, an electric bicycle computing system 310 is configured to limit the maximum power and/or speed of the electric bicycle according to the determined maximum allowable power and/or speed from one or more regulations databases 306, 322. In certain embodiments, the electric bicycle computing system 310 comprises a power control module 312 configured to control and/or limit the maximum power output of the electric bicycle's motor. The electric bicycle computing system 310 can also comprise a speed control module 314 configured to control and/or limit the maximum speed output of the motor.

In some embodiments, some or all data and user settings are logged, time/date stamped, and preserved for a period of time (for example, to preserve manufacturer liability in the event of a crash or misuse). For example, every time a location-based performance profile is created (for example, either from user specification of the location information or specific control parameters, or from automatic determination of location information and automatic configuration of relevant control parameters), any data generated and settings specified by the user are logged in a log database. In some embodiments, other data is also logged, such as speed, acceleration, distance traveled, throttle position, brake control position, distance from nearby vehicles, and/or the like. The system may be configured to periodically back up to another server or system for storage or analysis the data stored in the log database.

In certain embodiments, the user access point system 324 can be configured to enable the user (for example, rider) of the electric bicycle to select a riding mode from a plurality of riding modes such as a "bicycle" mode, a "moped" mode or an "off road only" mode. In one embodiment, the bicycle mode may, for example, turn off or disconnect the motor of the electric bicycle and enable driving the electric bicycle solely from pedaling, the moped mode may, for example, limit the capacity of the electric bicycle (for example, top speed, motor output, etc.) such that the electric bicycle falls under the definition of a moped (for example, the power control module 312 may be configured to limit the power output and/or speed of the electric bicycle to be within the limits defined by law), and the off-road-only mode may, for example, allow uninhibited top speed and/or motor output.

In certain embodiments, the electric bicycle computing system 310 and/or user access point system 324 comprises a speed detection module 316 configured to detect the current speed of the electric bicycle. The detected speed of the electric bicycle can be displayed to the rider via the user access point system 324 and/or other display means.

In certain embodiments, the electric bicycle computing system 310 and/or user access point system 324 comprises a navigation module 318 configured to communicate with a GPS module, detect the current location of the electric bicycle, and/or give directions to the rider. Directions can be displayed to the rider via the user access point system 324 and/or other display means.

In certain embodiments, the electric bicycle computing system 310 and/or user access point system 324 comprises a battery level detection module 320 configured to detect and/or monitor the current battery level by communicating with one or more battery sensors. In some embodiments, the electric bicycle computing system 310 is further configured to estimate a remaining distance or range the electric bicycle can travel based on the detected battery level. In some embodiments, the current battery level and/or estimated range is displayed to the rider via the user access point system 324 and/or other display means.

In certain embodiments, the electric bicycle computing system 310 and/or user access point system 324 are configured to control the suspension settings of the electric bicycle. In some embodiments, the user access point system 324 can display a suspension setting input field to a rider. The rider can insert a suspension setting of the rider's choice using the user access point system 324. In certain embodiments, the user access point system 324 is configured to receive a suspension setting selection from a rider and transmit the selection to the electric bicycle computing system 310. The electric bicycle computing system 310 can receive the selection input and control the electric bicycle accordingly.

For example, in some embodiments, an electric bicycle can be configured to have one or more suspension settings, such as soft, medium, or hard. If a rider selects the soft suspension setting, the electric bicycle computing system 310 can loosen the suspension settings of the electric bicycle by adjusting a shock absorbing mechanism of the electric bicycle. If a rider selects the hard suspension setting, the electric bicycle computing system 310 can tighten the suspension settings of the electric bicycle by adjusting a spring and/or shock absorbing mechanism of the electric bicycle.

The network may comprise one or more internet connections, secure peer-to-peer connections, secure socket layer (SSL) connections over the internet, virtual private network (VPN) connections over the internet, or other secure connections over the internet, private network connections, dedicated network connections (for example, IDSN, T1, or the like), wireless or cellular connections, or the like or any combination of the foregoing.

Computing System

Figure 3B:
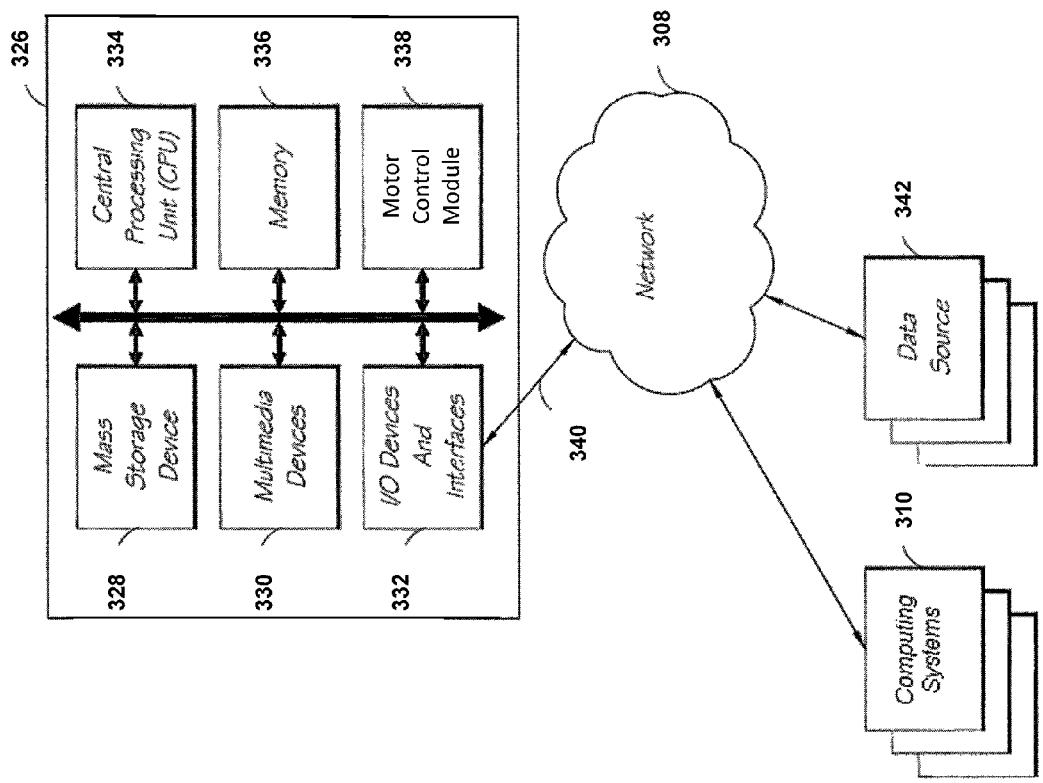
FIG. 3B is a block diagram depicting one embodiment of a computer hardware system configured to run software for implementing one or more embodiments of the motor output control system described herein.
Figure 3C:
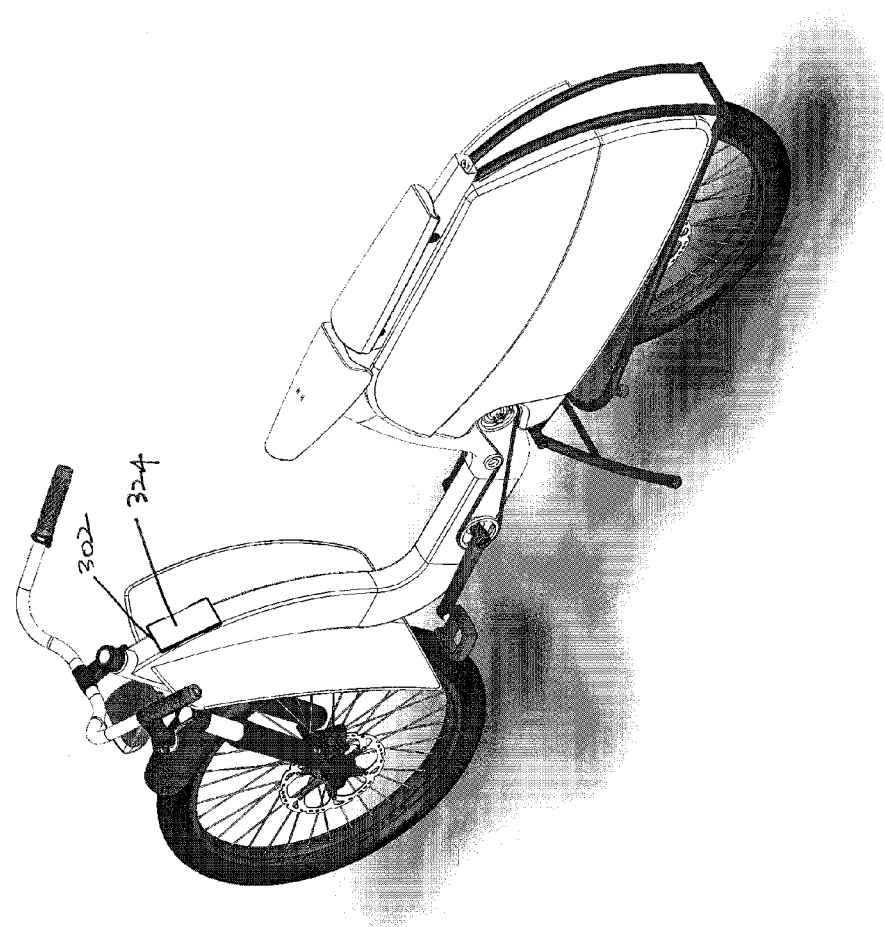
Figure 3E:
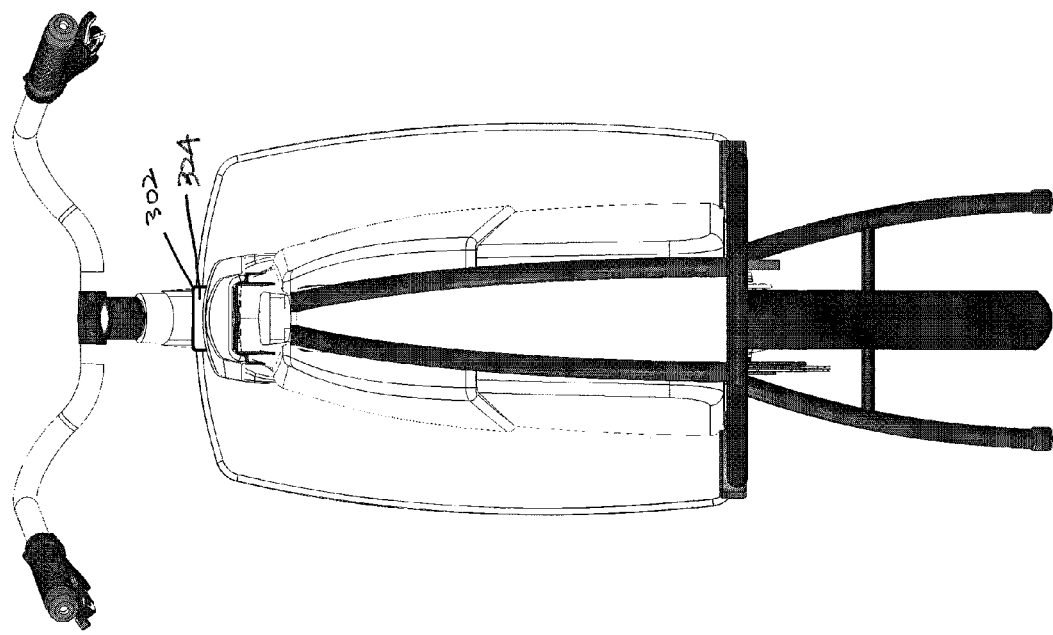
Figure 3F:
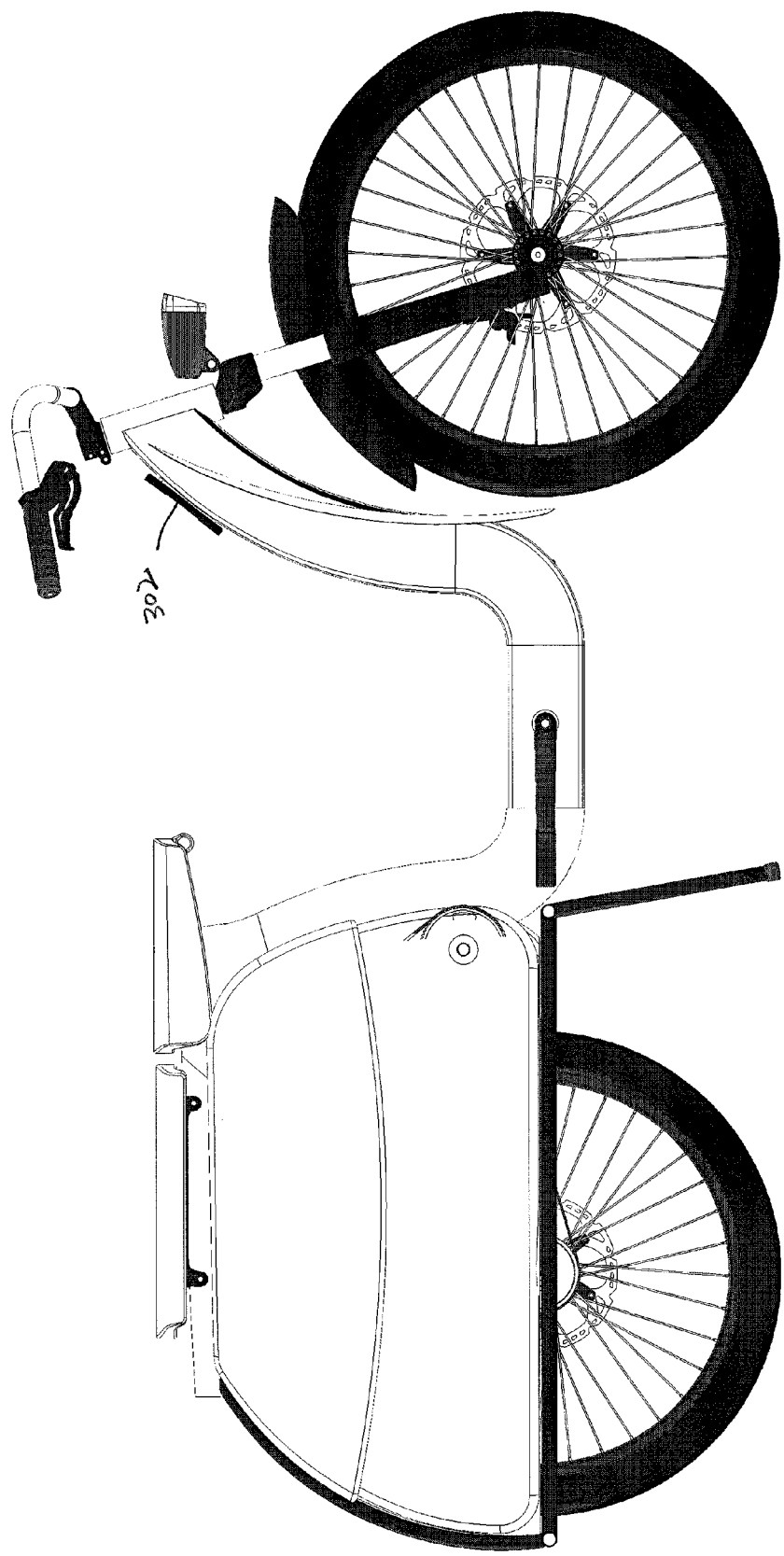
Figure 3G:
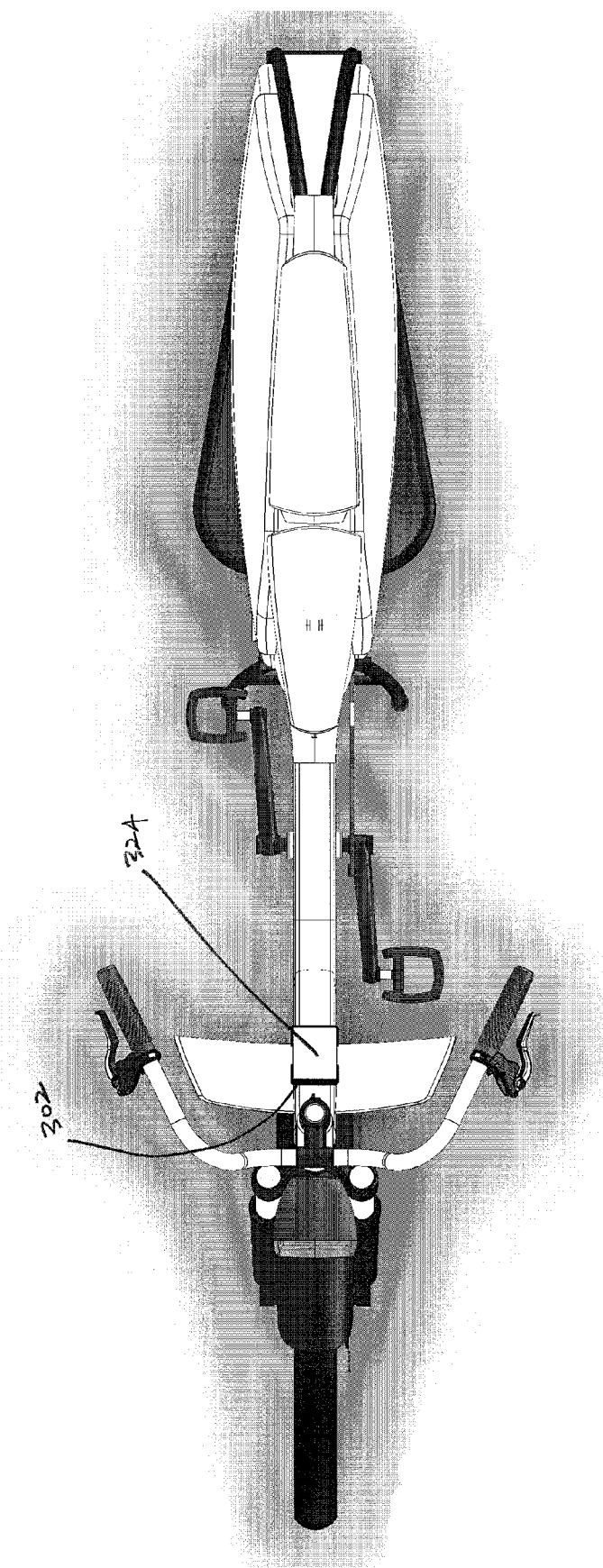
Figure 3H:
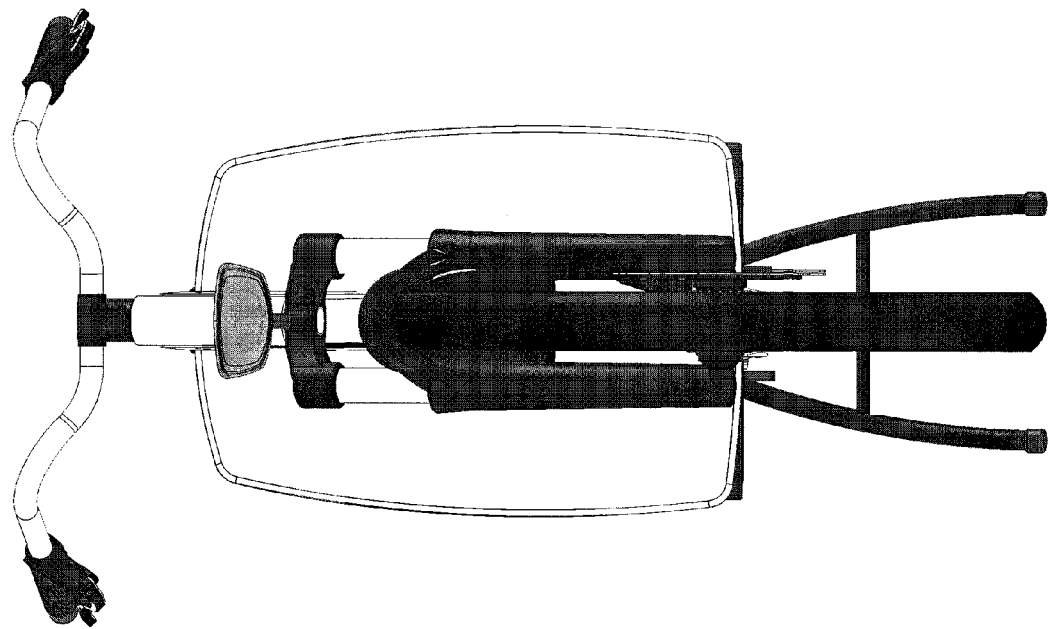
Figure 31:
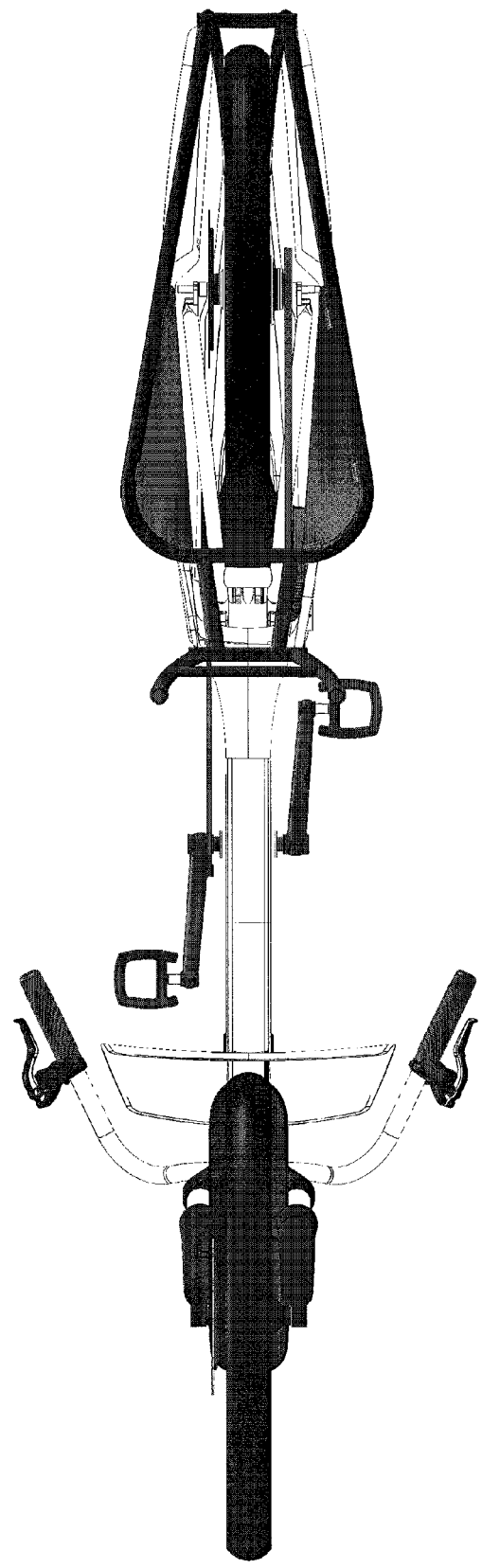

In some embodiments, the computer clients and/or servers described above take the form of a computing system 326 illustrated in FIG. 3B, which is a block diagram of one embodiment of a computing system that is in communication with one or more computing systems 310 and/or one or more data sources 342 via one or more networks 308. The computing system 326 may be used to implement one or more of the systems and methods described herein. In addition, in one embodiment, the computing system 326 may be configured to control the output speed and/or power of an electric bicycle's motor. While FIG. 3B illustrates one embodiment of a computing system 326, it is recognized that the functionality provided for in the components and modules of computing system 326 may be combined into fewer components and modules or further separated into additional components and modules.

Motor Control Module

In one embodiment, the system 326 comprises a motor control module 338 that carries out the functions described herein with reference to controlling the output power and/or speed of an electric bicycle's motor. The motor control module 338 may be executed on the computing system 326 by a central processing unit 334 discussed further below.

In general, the word "module," as used herein, refers to logic embodied in hardware or firmware, or to a collection of software instructions, possibly having entry and exit points, written in a programming language, such as, for example, COBOL, CICS, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware.

Generally, the modules described herein refer to logical modules that may be combined with other modules or divided into sub-modules despite their physical organization or storage.

Computing System Components

In one embodiment, the computing system 326 also comprises a mainframe computer suitable for controlling and/or communicating with large databases, performing high volume transaction processing, and generating reports from large databases. The computing system 326 also comprises a central processing unit ("CPU") 334, which may comprise a conventional microprocessor. The computing system 326 further comprises a memory 336, such as random access memory ("RAM") for temporary storage of information and/or a read only memory ("ROM") for permanent storage of information, and a mass storage device 328, such as a hard drive, diskette, or optical media storage device. Typically, the modules of the computing system 326 are connected to the computer using a standards based bus system. In different embodiments, the standards based bus system could be Peripheral Component Interconnect (PCI), Microchannel, SCSI, Industrial Standard Architecture (ISA) and Extended ISA (EISA) architectures, for example.

The computing system 326 comprises one or more commonly available input/output (I/O) devices and interfaces 332, such as a keyboard, mouse, touchpad, and printer. In one embodiment, the I/O devices and interfaces 332 comprise one or more display devices, such as a monitor, that allows the visual presentation of data to a user. More particularly, a display device provides for the presentation of GUIs, application software data, and multimedia presentations, for example. In the embodiment of FIG. 3B, the I/O devices and interfaces 332 also provide a communications interface to various external devices. The computing system 326 may also comprise one or more multimedia devices 330, such as speakers, video cards, graphics accelerators, and microphones, for example.

Computing System Device/Operating System

The computing system 326 may run on a variety of computing devices, such as, for example, a server, a Windows server, a Structure Query Language server, a Unix server, a personal computer, a mainframe computer, a laptop computer, a cell phone, a personal digital assistant, a kiosk, an audio player, and so forth. The computing system 200 is generally controlled and coordinated by operating system software, such as z/OS, Windows 95, Windows 98, Windows NT, Windows 2000, Windows XP, Windows Vista, Windows 7, Linux, BSD, SunOS, Solaris, or other compatible operating systems. In Macintosh systems, the operating system may be any available operating system, such as MAC OS X. In other embodiments, the computing system 200 may be controlled by a proprietary operating system. Conventional operating systems control and schedule computer processes for execution, perform memory management, provide file system, networking, and I/O services, and provide a user interface, such as a graphical user interface ("GUI"), among other things.

Network

In the embodiment of FIG. 3B, the computing system 326 is coupled to a network 308, such as a LAN, WAN, or the Internet, for example, via a wired, wireless, or combination of wired and wireless, communication link 340. The network 308 communicates with various computing devices and/or other electronic devices via wired or wireless communication links. In the embodiment of FIG. 3B, the network 308 is communicating with one or more computing systems 310 and/or one or more data sources 342.

Access to the motor control module 338 of the computer system 326 by computing systems 310 and/or by data sources 342 may be through a web-enabled user access point such as the computing systems' 310 or data source's 342 personal computer, cellular phone, laptop, or other device capable of connecting to the network 308. Such a device may have a browser module is implemented as a module that uses text, graphics, audio, video, and other media to present data and to allow interaction with data via the network 308.

The browser module may be implemented as a combination of an all points addressable display such as a cathode-ray tube (CRT), a liquid crystal display (LCD), a plasma display, or other types and/or combinations of displays. In addition, the browser module may be implemented to communicate with input devices 332 and may also comprise software with the appropriate interfaces which allow a user to access data through the use of stylized screen elements such as, for example, menus, windows, dialog boxes, toolbars, and controls (for example, radio buttons, check boxes, sliding scales, and so forth). Furthermore, the browser module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition a touch screen may act as a hybrid input/output device. In another embodiment, a user may interact with the system more directly such as through a system terminal connected to the computing system without communications over the Internet, a WAN, or LAN, or similar network.

In some embodiments, the system 326 may comprise a physical or logical connection established between a remote microprocessor and a mainframe host computer for the express purpose of uploading, downloading, or viewing interactive data and databases on-line in real time. The remote microprocessor may be operated by an entity operating the computer system 326, including the client server systems or the main server system, and/or may be operated by one or more of the data sources 342 and/or one or more of the computing systems. In some embodiments, terminal emulation software may be used on the microprocessor for participating in the micro-mainframe link.

In some embodiments, computing systems 310 who are internal to an entity operating the computer system 326 may access the motor control module 338 internally as an application or process run by the CPU 334.

Other Systems

In addition to the systems that are illustrated in FIGS. 3A-3B, the network 308 may communicate with other data sources or other computing devices. The computing system 326 may also comprise one or more internal and/or external data sources. In some embodiments, one or more of the data repositories and the data sources may be implemented using a relational database, such as DB2, Sybase, Oracle, CodeBase and Microsoft® SQL Server as well as other types of databases such as, for example, a flat file database, an entity-relationship database, and object-oriented database, and/or a record-based database.

User Access Point

In an embodiment, a user access point or user access point system 324 comprises a personal computer, a laptop computer, a cellular phone, an iPhone®, a GPS system, a Blackberry® device, a portable computing device, a server, a computer workstation, a local area network of individual computers, an interactive kiosk, a personal digital assistant, an interactive wireless communications device, a handheld computer, an embedded computing device, or the like.

FIGS. 3C-3I illustrate an example of an embodiment of an electric bicycle that is configured to be coupled with a user access point or user access point system 324 for controlling the electric bicycle. In some embodiments, the user access point system 324 can be permanently and/or semi-permanently installed. In other embodiments, the user access point system 324 is a mobile device that can be selectively installed and/or removed. In some embodiments, the user access point system 324 comprises more than one separate computing device, such as, for example, a cellular phone or smartphone configured to be carried by a user and to electronically communicate, wired and/or wirelessly, with a separate computing device configured to be permanently or removably attached to the electric bicycle. In some embodiments, a user access point system 324 is configured to communicate with the electric bicycle computing system 310 wirelessly. For example, the user access point system 324 may comprise a smartphone configured to be carried by a user and to wirelessly communicate with the electric bicycle computing system 310.

In some embodiments, a user access point system 324 is configured to be attached and installed to the electric bicycle via a connector mechanism 302. In some embodiments, the connector mechanism 302 comprises a cradle or a case that is configured to hold the user access point system and a data port configured to connect the user access point system 324 to the electric bicycle computing system 310. The cradle or case 302 can be permanently or semi-permanently attached to the frame of the electric bicycle.

In some embodiments, the user access point system 324 can comprise software that allows the rider to select or set a maximum output of the electric motor's power and/or speed. For example, using the software and/or user interface, the rider can set the maximum output of the electric bicycle's power to about or exactly 250 watts (currently the most common requirement in Europe), about or exactly 500 watts, about or exactly 600 watts, about or exactly 700 watts, about or exactly 750 watts, about or exactly 800 watts, about or exactly 900 watts, about or exactly 1000 watts, about or exactly 1100 watts, about or exactly 1200 watts, about or exactly 1300 watts, about or exactly 1400 watts, about or exactly 1500 watts, about or exactly 2000 watts, about or exactly 3000 watts, about or exactly 4000 watts, about or exactly 5000 watts or any other value.

In certain embodiments, the software and/or user interface of the user access point system 324 is configured such that a user only needs to select a state or jurisdiction where the user is currently located. The user access point system 324 in certain embodiments comprises a pre-stored database that comprises data of each jurisdiction's electric bicycle regulations and/or laws. For example, a user access point system 324 can have pre-stored the maximum power and/or speed of electric bicycles allowed by law of one or more jurisdictions. In other embodiments, data related to the maximum power and/or speed of electric bicycles allowed by law of one or more jurisdictions is stored in the electric bicycle computing system 310 and/or main computing system 304.

In some embodiments, when a rider selects a particular jurisdiction, the user access point system 324, electric bicycle computing system 310, and/or main computing system 304 is configured to determine the maximum power and/or speed limit of the selected jurisdiction using a pre-stored database and restrict the electric bicycle accordingly. For example, if a rider inputted via the user access point system 324 that the rider is currently in California, the user access point system 324, electric bicycle computing system 310, and/or main computing system 304 can be configured to automatically determine or identify that the maximum power output for electric bicycles in California is 1000 watts and limit the power output of the electric motor to 1000 watts.

In certain embodiments, the user access point system 324 and/or electric bicycle computing system 310 comprises a GPS module which is configured to automatically and/or periodically determine the location of the electric bicycle, identify the maximum power and/or speed allowed by the appropriate jurisdiction's regulations, and limit the power and/or speed of the electric bicycle to that value(s). For example, if the user access point system 324 and/or electric bicycle computing system 310 determines that the electric bicycle is currently in California, the user access point system 324 and/or electric bicycle computing system 310 can automatically identify that the maximum power output in California is limited to 1000 watts and restrict the power output to 1000 watts. When the user access point system 300 and/or electric bicycle computing system 310 determines that the electric bicycle is in New York at a later point in time, the user access point system 324 and/or electric bicycle computing system can then automatically determine that the electric bicycle is currently in New York and restrict the maximum power and/or speed of the electric bicycle to the maximum value(s) allowed in New York.

In certain embodiments, the user access point system 324 can be configured to provide additional features as well. For example, the user access point system 324 can be configured to function as a speedometer and display the current speed of the electric bicycle to the user. In some embodiments, the user access point system 324 can also provide a GPS navigation system and/or map to the user via a GPS module. Furthermore, in certain embodiments, the user access point system 324 can be configured to provide driving education software to the user for efficient driving.

In addition, in some embodiments the user access point system 324 is configured to function as a key for locking and/or unlocking the electric bicycle. For example, when a rider attaches and/or installs the user access point system 324 into the electric bicycle, the electric bicycle computing system 310 can be configured to validate the identity of the user access point system 324 and unlock the electric bicycle if validated. Similarly, when a rider removes the user access point system 324 from the electric bicycle in certain embodiments, the electric bicycle computing system 310 can be configured to automatically detect that the user access point system 324 is removed and lock the electric bicycle.

Methods of Controlling Maximum Output

Figure 3J:
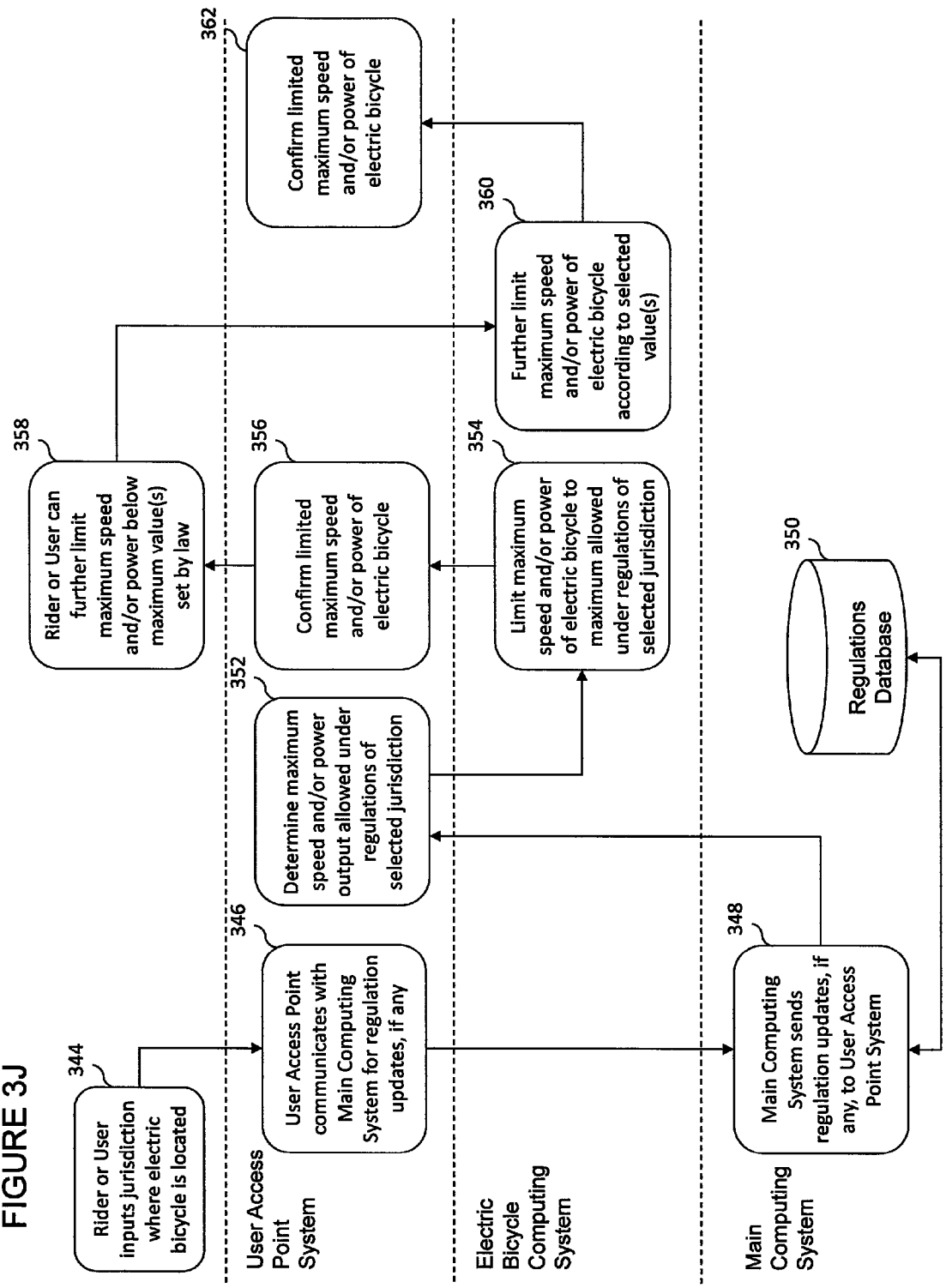
FIG. 3J is a block diagram depicting an overview of one embodiment of a method of controlling the maximum output of a motor of an electric bicycle.
Figure 4A:
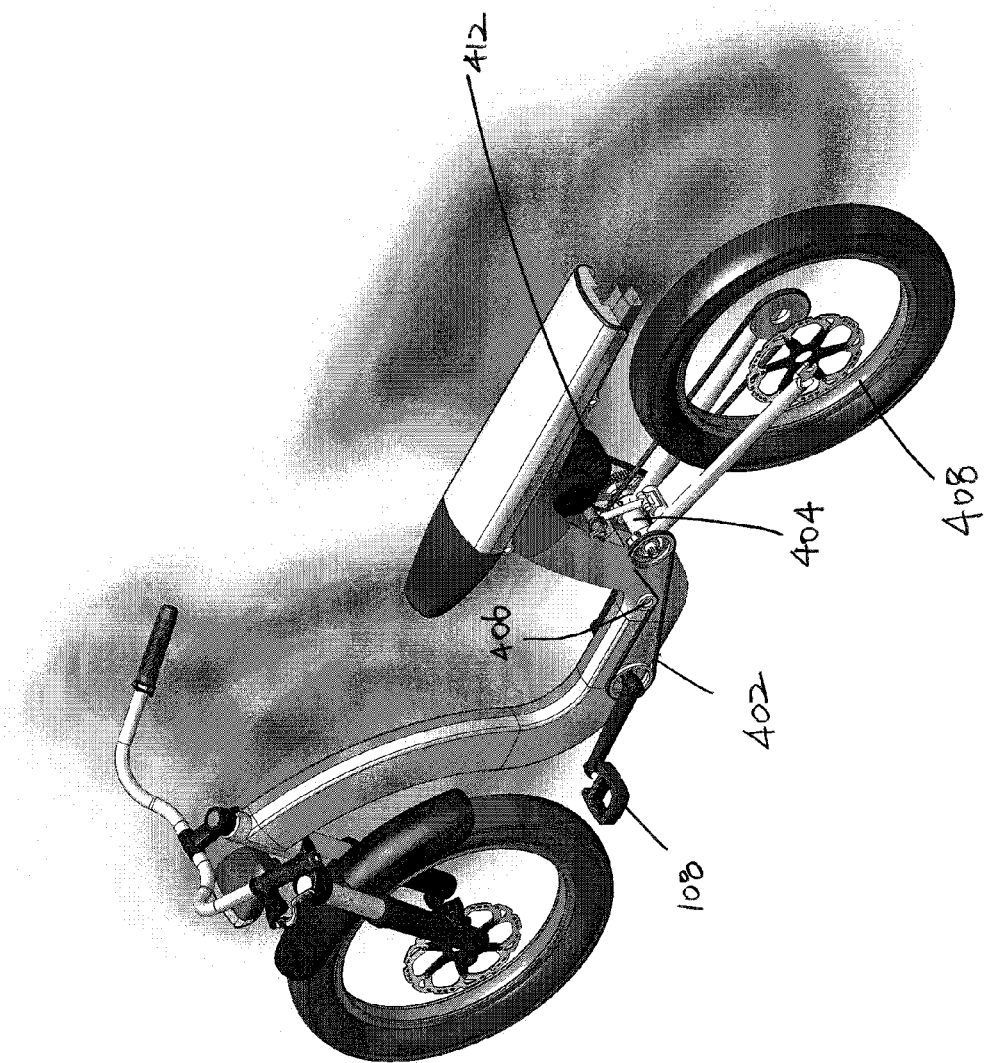
Figure 4B:
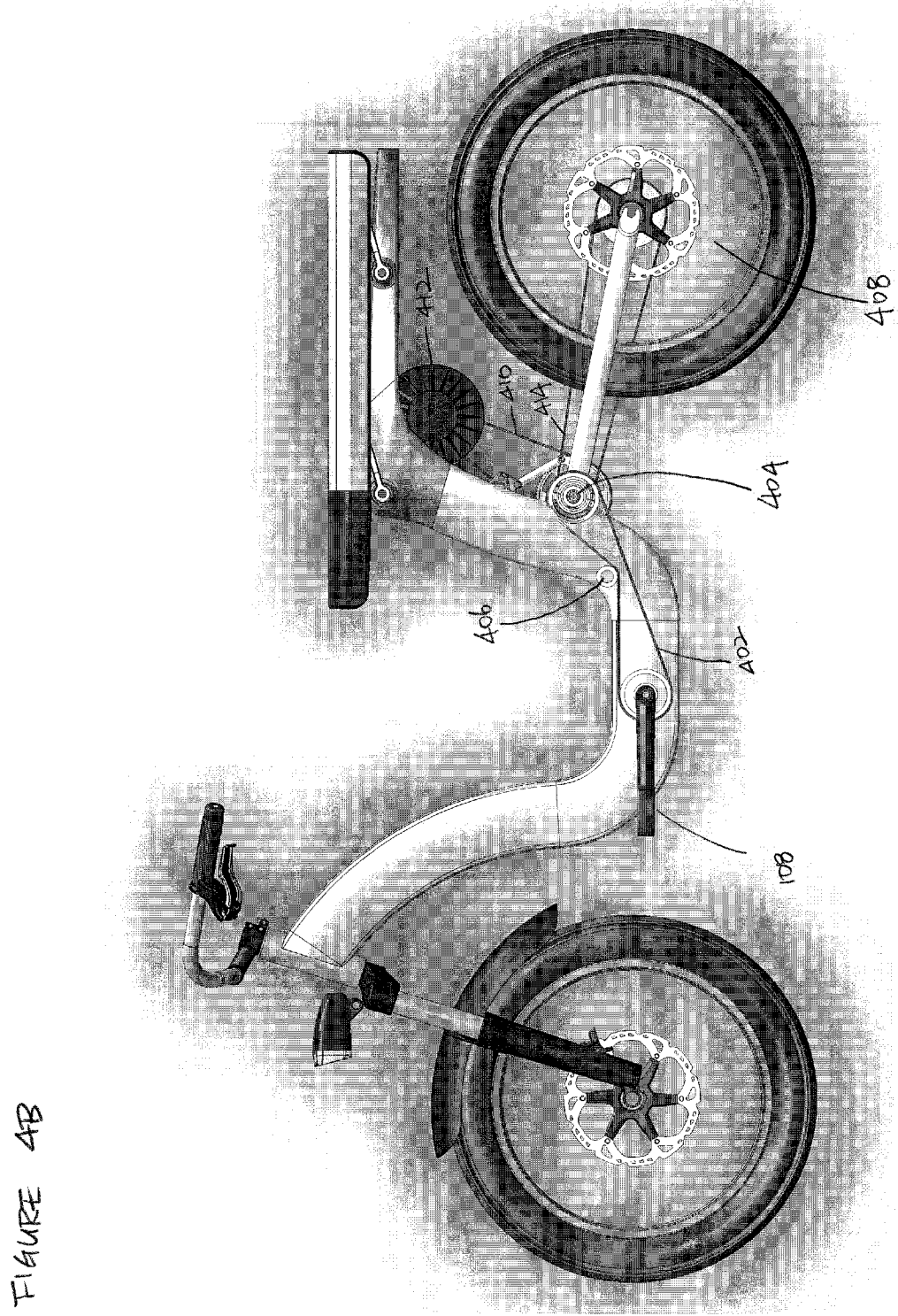
Figure 4C:
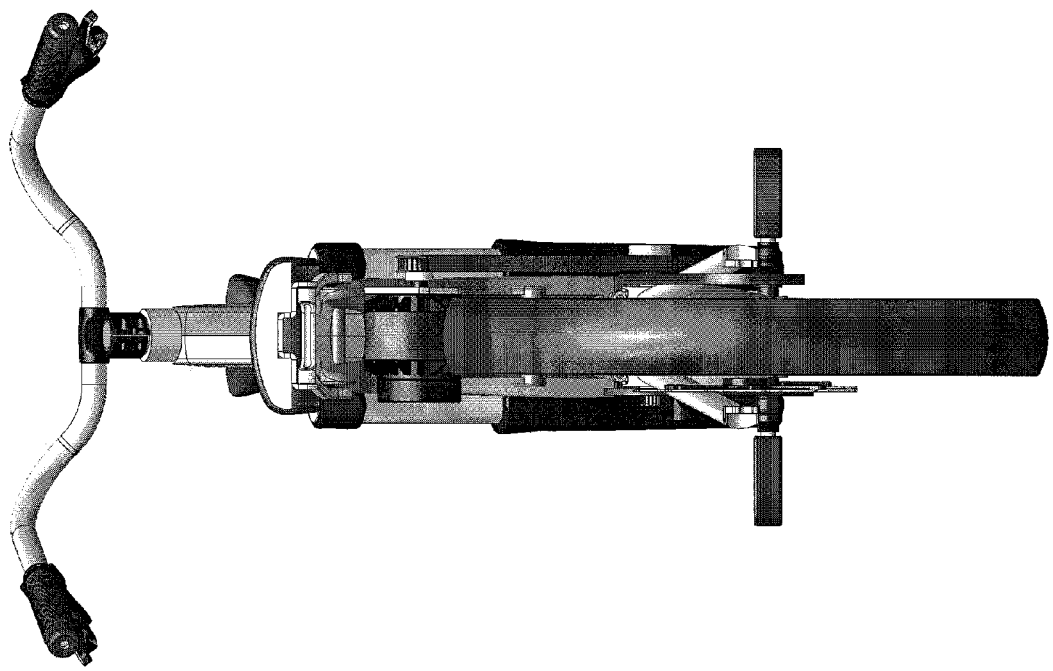
Figure 4D:
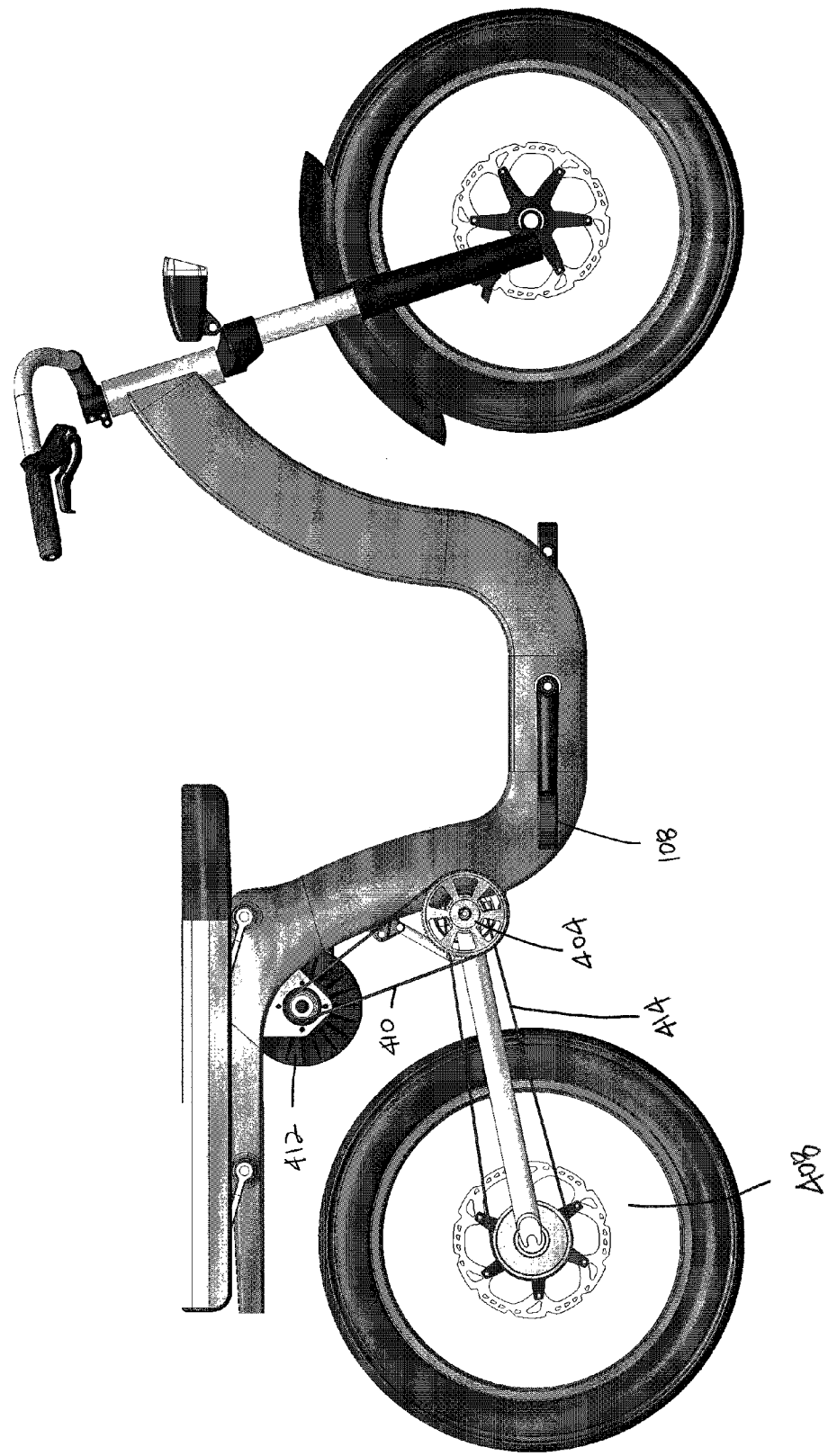
Figure 4E:
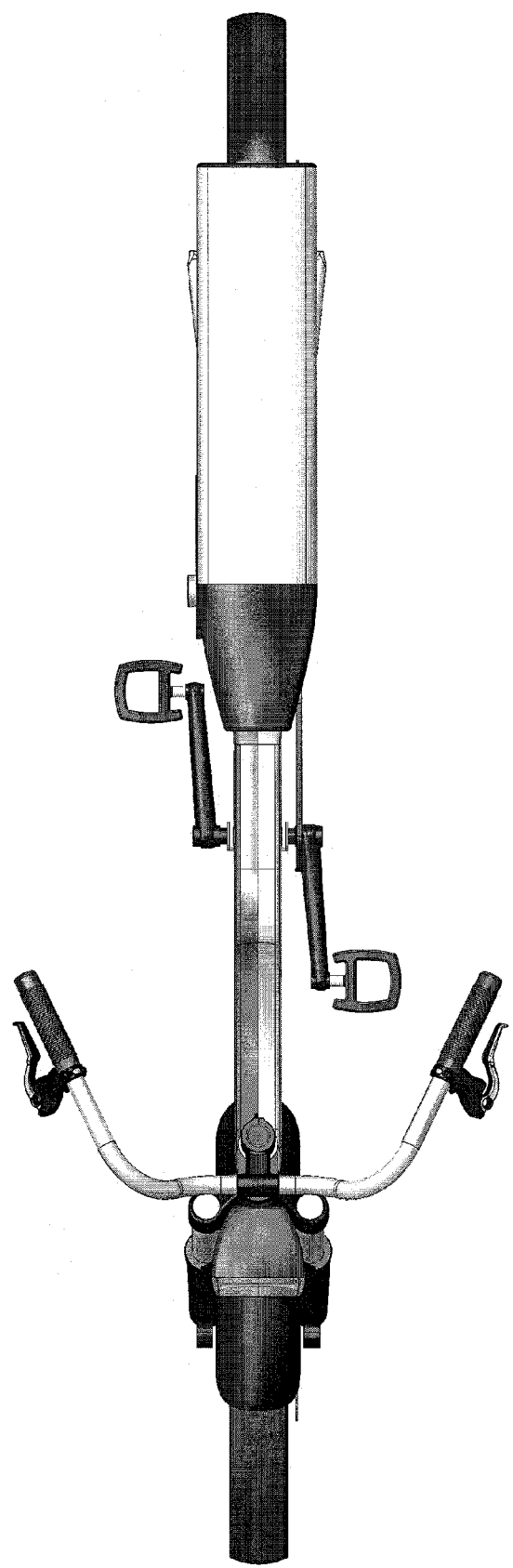
Figure 4F:
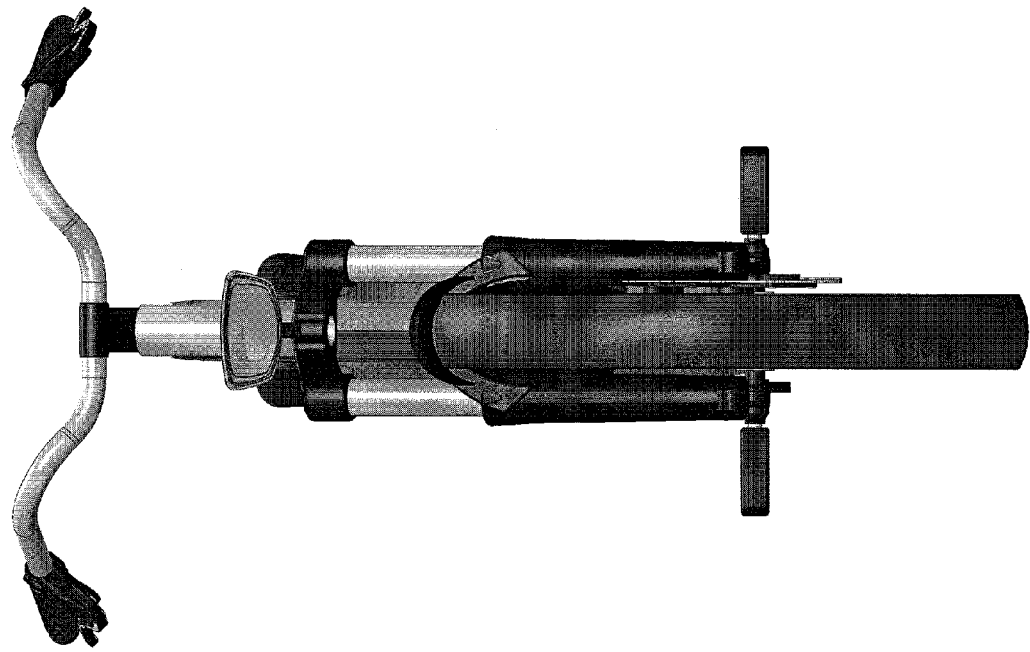
Figure 44:
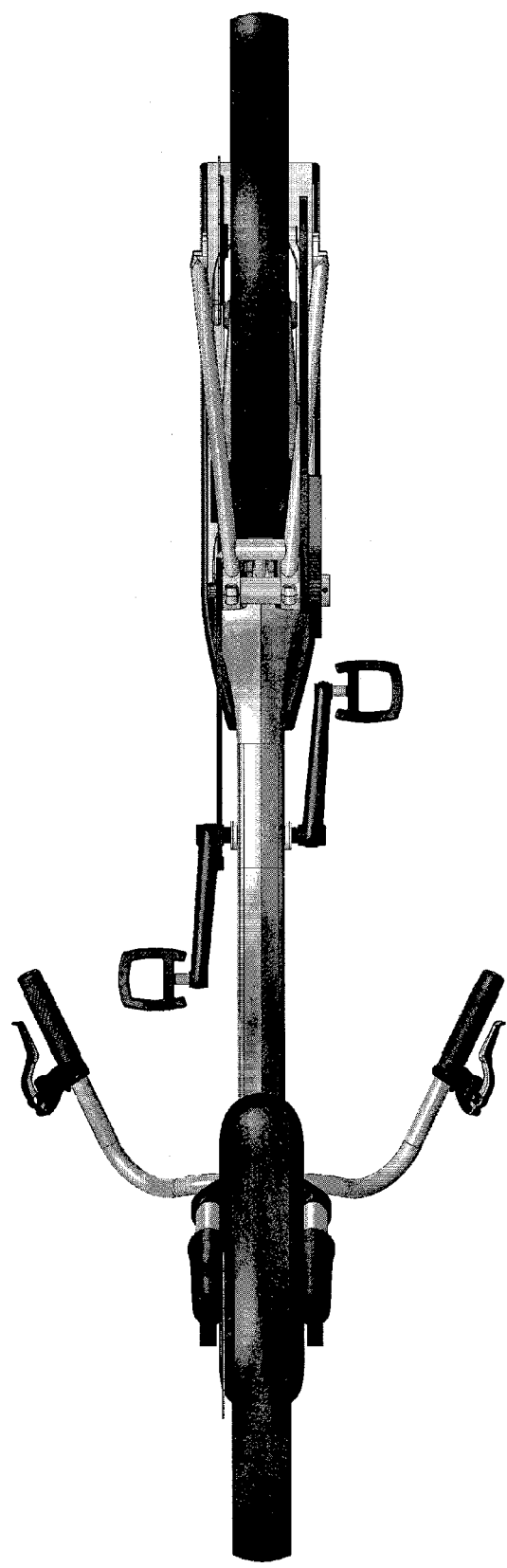
Figure 5:
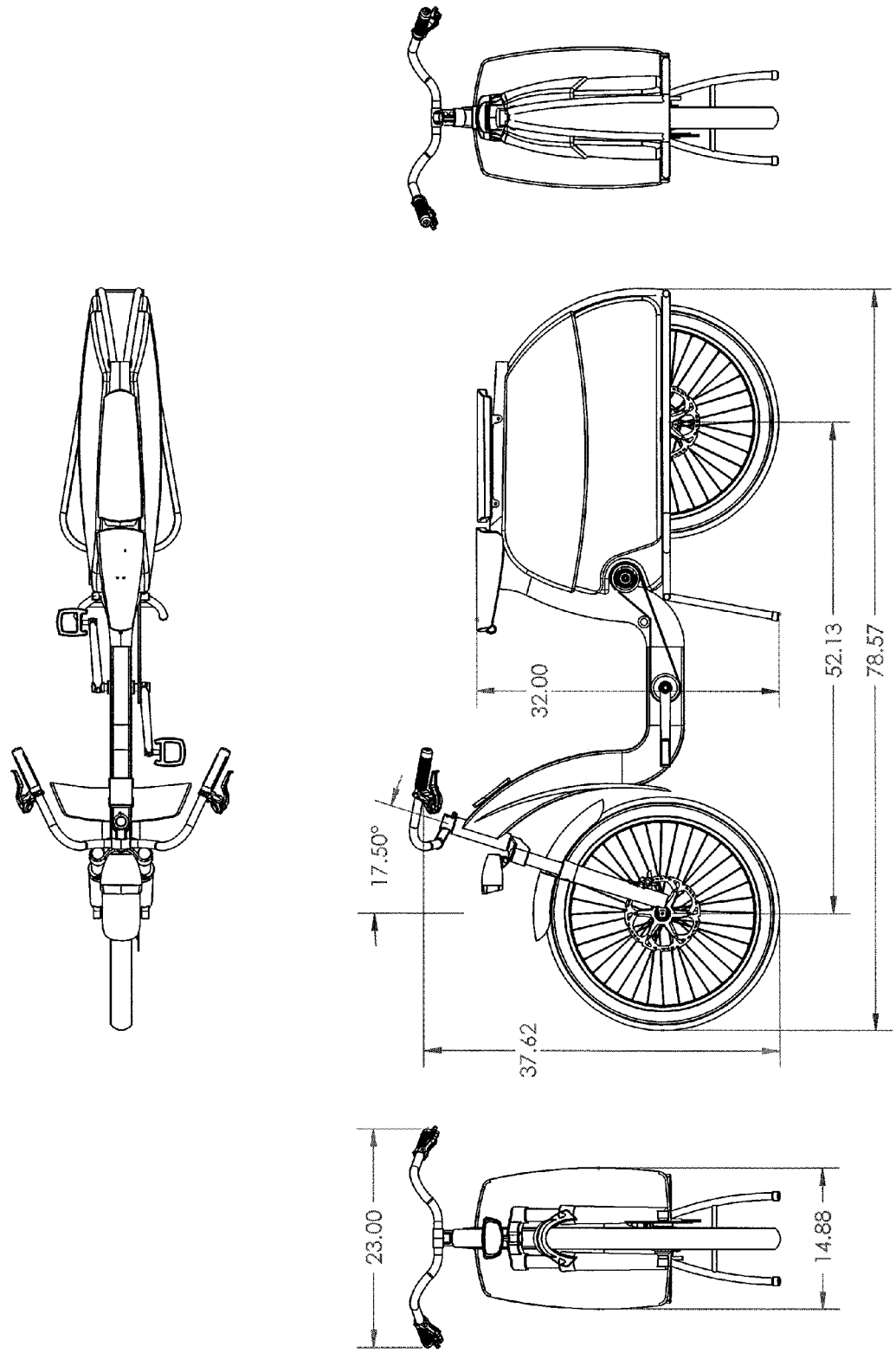
FIG. 5 depicts an example of one embodiment of an electric bicycle.

FIG. 3J illustrates an overview of one embodiment of a method of controlling the maximum output of a motor of an electric bicycle. In some embodiments, a user and/or rider inputs or selects via a user access point system a jurisdiction where the electric bicycle is located at block 344. In certain embodiments, the user access point system is configured to display only certain jurisdictions, such as certain states and/or countries. In other embodiments, the system is configured to automatically detect the jurisdiction.

In certain embodiments, the electric bicycle computing system communicates with a main computing system and/or other database(s) for any regulation updates at block 346. In some embodiments, the main computing system communicates with one or more regulations databases 350 to obtain the most recent regulations. In certain embodiments, the user access point system only communicates with the main computing system for updates only when necessary or periodically at predetermined intervals. In other embodiments, the user access point system does not communicate with the main computing system for updates.

In some embodiments, the user access point system determines the maximum speed and/or power output allowed for an electric bicycle under the updated, if any, regulations of the selected jurisdiction at block 352. An electric bicycle computing system in certain embodiments can limit the maximum speed and/or power of the electric bicycle according to the determined legal limits at block 354.

In certain embodiments, the user access point system displays the set maximum power and/or speed to the rider at block 356 for confirmation. If the rider confirms, then the maximum speed and/or power output of the electric bicycle is set to the maximum level allowable under that jurisdiction's regulations. In some embodiments, the user access point system is configured to display to the rider or user an option to even lower the maximum power and/or speed of the electric bicycle below the jurisdiction's legal limits at block 358. For example, a parent may decide to further limit the maximum power and/or speed of a child's electric bicycle.

In some embodiments, if a rider or user selects a lower maximum speed and/or power limit of the electric bicycle at block 358, the electric bicycle computing can then limit such to the selected level at block 360. In certain embodiments, the user access point system confirms the lower maximum speed and/or power value selected at block 362.

Motor Placement

Generally, most electric bicycles comprise a hub-motor that is located within the rear wheel frame of the electric bicycle. However, such designs have many disadvantages. For example, because hub-motors cannot be configured to be used with gears, a specially designed low RPM motor must be used for placement inside the rear wheel frame. Also, the weight of the hub-motor naturally affects the weight of the rear wheel and affects the dynamics of the electric bicycle. In addition, due to the restrictions in size and placement, only motors of a particular size and/or configuration may be installed in such electric bicycles. Further, it can be difficult to remove and/or install a hub-motor due to its placement inside the rear wheel frame. In some cases, the whole rear wheel has to be replaced in order to replace a hub-motor.

In contrast, in an embodiment of an electric bicycle, the electric motor is placed outside the rear wheel frame. In some embodiments, the electric motor is placed substantially beneath the seat frame. FIGS. 4A-4G illustrate an example of an embodiment of an electric bicycle where the electric motor 412 is located beneath the seat and is attached directly to the bicycle frame itself. In some embodiments, the motor 412 is located substantially above a jackshaft 404.

By locating the motor 412 outside of the rear wheel frame, such embodiments of an electric bicycle are more flexible and adaptable as they can be used with a wider range of motors. For example, because the motor 412 is not located within the rear wheel frame, the motor 412 can be configured to be used in conjunction with hinge gears, which allows use of a number of conventional motors that are not necessarily specially designed for low RPM. Also, there are less weight restrictions as the weight of the wheel itself is not affected by the motor 412. In addition, motors 412 with a wider range of sizes and/or configurations can be installed. Further, it is easier to remove and/or install a motor 412.

Drivetrain Design

In some embodiments, the drivetrain of an electric bicycle is chain-free and comprises belt drives 402, 410, 414. In some embodiments, one or more belt drives 402, 410, 414 of the electric bicycle or portions thereof are covered. For example, in some embodiments where one or more bags 200 are located in the rear of the bicycle, one or more belt drives 402, 410, 414, jackshaft 414, motor 412, and/or portions thereof may be protectively covered by portions of one or more bags 200.

In certain embodiments, an electric bicycle is configured such that there is complete independence between the electric motor 412 and pedals 108. For example, in some embodiments, there is no or substantially no resistance to the pedals 108 from the motor 412 when the motor is powering the electric bicycle. In certain embodiments, when the electric bicycle is powered by the motor 412, the motor 412 moves a first belt drive 410, which further turns a jackshaft 404. As the jackshaft 404 is turned, a second belt drive 414 is moved thereby turning the real wheel 408.

In some embodiments, when the pedals 108 are moved to power the electric bicycle, the pedals 108 move a third belt drive 402 which further turns a jackshaft 404. In some embodiments, an electric bicycle comprises an idler 406 contacting the third belt drive 402. In some embodiments, the same jackshaft 404 is turned by both manual pedaling 108 and the electric motor 412. As the jackshaft 404 is turned, the second belt drive 414 is moved thereby turning the rear wheel 408.

In some embodiments, the first, second, and third belt drives 410, 414, 402 substantially form a T-shape with the jackshaft 404 located at the intersection. In certain embodiments, the angle between the first and second belt drives 410, 414, the first and third belt drives 410, 402, and/or the second and third belt drives 414, 402 is about 5°, about 10°, about 15°, about 20°, about 25°, about 30°, about 35°, about 40°, about 45°, about 50°, about 55°, about 60°, about 65°, about 70°, about 75°, about 80°, about 85°, about 90°, about 95°, about 100°, about 105°, about 110°, about 115°, about 120°, about 125°, about 130°, about 135°, about 140°, about 145°, about 150°, about 155°, about 160°, about 165°, about 170°, about 175°, about 180°, or any other angle.

In some embodiments, the third belt drive 402 is located on one side of the electric bicycle and the first and second belt drives 410, 414 are located on the other side of the electric bicycle. In other embodiments, the second belt drive 414 is located on one side of the electric bicycle and the first and third belt drives 410, 402 are located on the other side of the electric bicycle. In certain embodiments, the first belt drive 410 is located on one side of the electric bicycle and the second and third belt drives 414, 402 are located on the other side of the electric bicycle. In other embodiments, the first, second, and third belt drives 410, 414, 402 are all located on the same side of the electric bicycle.

In some embodiments, the various belt drives are on pulleys attached to the various axles. For instance, a first belt drive 410 may be on a pulley connected to the electric motor 412 and on a pulley connected to the jackshaft 404. An axle is connected to this pulley on the jackshaft 404 which connects to other pulleys on the axle. Among these other pulleys, one pulley may be connected to the second belt drive 414 and another pulley connected to the third belt drive 402. The jackshaft 404 and axle may have more or less pulleys in various arrangements and locations, depending on the arrangements and locations of the various belt drives.

Shock Linkage

In an embodiment, the rear wheel suspension of the electric bicycle uses shock linkage instead of direct shock. By using a shock linkage instead of a direct shock it is possible to withstand a wide range of loads by making slight adjustments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope of the inventions or claims.

Although the embodiments of the inventions have been disclosed in the context of a certain preferred embodiments and examples, it will be understood by those skilled in the art that the present inventions extend beyond the specifically disclosed embodiments to other alternative embodiments and/or uses of the inventions and obvious modifications and equivalents thereof. In addition, while a number of variations of the inventions have been shown and described in detail, other modifications, which are within the scope of the inventions, will be readily apparent to those of skill in the art based upon this disclosure. It is also contemplated that various combinations or subcombinations of the specific features and aspects of the embodiments may be made and still fall within one or more of the inventions. Accordingly, it should be understood that various features and aspects of the disclosed embodiments can be combine with or substituted for one another in order to form varying modes of the disclosed inventions. Thus, it is intended that the scope of the present inventions herein disclosed should not be limited by the particular disclosed embodiments described above.

What is claimed is:

1. A dynamically configurable electric bicycle propulsion system comprising:
    an electric motor that converts stored electrical power into rotational motion for rotating a wheel of a bicycle; and
    an electric bicycle computing unit electrically coupled with the motor to control a performance characteristic of the motor,
    wherein the electric bicycle computing unit communicates electronically with a mobile computing device comprising a geolocation system to determine a current geographic location of the bicycle,
    wherein a jurisdictional limit related to the performance characteristic is determined by accessing an electronic regulations database using a query based on the current geographic location of the bicycle determined by the mobile computing device,
    wherein the electric bicycle computing unit limits the performance characteristic of the motor such that the performance characteristic complies with the jurisdictional limit, and
    wherein the performance characteristic comprises a power output of the motor and the jurisdictional limit defines a maximum power output allowed in the current geographic location.

2. The electric bicycle propulsion system of claim 1, wherein the current geographic location of the electric bicycle and the jurisdictional limit are automatically determined based on information provided by the geolocation system of the mobile computing device, and wherein the electric bicycle computing unit automatically limits the performance characteristic of the motor in response to the determination of the jurisdictional limit to prohibit a user from causing the jurisdictional limit to be exceeded.

3. The electric bicycle propulsion system of claim 1, wherein the electric bicycle computing unit controls at least two performance characteristics of the motor based on at least two jurisdictional limits.

4. The electric bicycle propulsion system of claim 3, wherein one of the at least two performance characteristics comprises a rotational speed of the motor and one of the at least two jurisdictional limits defines a maximum bicycle speed allowed in the current geographic location.

5. The electric bicycle propulsion system of claim 1, wherein the electric bicycle computing unit accesses the regulations database to determine the jurisdictional limit.

6. The electric bicycle propulsion system of claim 1, wherein the mobile computing device accesses the regulations database to determine the jurisdictional limit, and the mobile computing device transmits data to the electric bicycle computing unit comprising the jurisdictional limit.

7. The electric bicycle propulsion system of claim 1, wherein the electric bicycle computing unit communicates electronically with the mobile computing device using a wireless connection.

8. The electric bicycle propulsion system of claim 1, wherein the geolocation system of the mobile computing device uses at least one of a global positioning system or cellular tower triangulation to determine the current geographic location of the bicycle.

9. The electric bicycle propulsion system of claim 1, further comprising a bicycle frame.

10. The electric bicycle propulsion system of claim 9, further comprising a cradle coupled to the bicycle frame, the cradle shaped to removably hold the mobile computing device and positioned such that an electronic display of the mobile computing device is visible to a rider of the bicycle.

11. A dynamically configurable electric bicycle propulsion system comprising:
    a mobile computing device that electronically communicates with an electric bicycle computing unit electrically coupled with a motor that converts stored electrical power into rotational motion for rotating a wheel of a bicycle, wherein the electric bicycle computing unit controls a performance characteristic of the motor,
    wherein the mobile computing device comprises a geolocation system that determines a current geographic location of the mobile computing device,
    wherein the mobile computing device accesses a regulations database using a query based on the current geographic location to determine a jurisdictional limit related to the performance characteristic of the motor,
    wherein the mobile computing device transmits data to the electric bicycle computing unit based on the determined jurisdictional limit to enable the electric bicycle computing unit to limit the performance characteristic to comply with the jurisdictional limit, and
    wherein the performance characteristic comprises a power output of the motor and the jurisdictional limit defines a maximum power output allowed in the current geographic location.

12. The electric bicycle propulsion system of claim 11, wherein the current geographic location and the jurisdictional limit are automatically determined by the mobile computing device, and wherein the electric bicycle computing unit automatically limits the performance characteristic of the motor in response to the data transmitted by the mobile computing device to prohibit a user from causing the jurisdictional limit to be exceeded.

13. The electric bicycle propulsion system of claim 11, wherein the electric bicycle computing unit controls at least two performance characteristics of the motor based on at least two jurisdictional limits.

14. The electric bicycle propulsion system of claim 13, wherein one of the at least two performance characteristics comprises a rotational speed of the motor and one of the at least two jurisdictional limits defines a maximum bicycle speed allowed in the current geographic location.

15. The electric bicycle propulsion system of claim 11, wherein the electric bicycle computing unit communicates electronically with the mobile computing device using a wireless connection.

16. The electric bicycle propulsion system of claim 11, wherein the geolocation system of the mobile computing device uses at least one of a global positioning system or cellular tower triangulation to determine the current geographic location.

17. The electric bicycle propulsion system of claim 11, further comprising a cradle adapted to be coupled to a bicycle frame, the cradle shaped to removably hold the mobile computing device.

\* \* \* \* \*